United States Patent
Zhang et al.

(10) Patent No.: US 12,307,815 B2
(45) Date of Patent: May 20, 2025

(54) FACE RECOGNITION METHOD AND FACE RECOGNITION APPARATUS

(71) Applicant: Huawei Technologies Co., Ltd., Shenzhen (CN)

(72) Inventors: Honglei Zhang, Beijing (CN); Zhigang Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 308 days.

(21) Appl. No.: 17/758,946

(22) PCT Filed: Jul. 30, 2020

(86) PCT No.: PCT/CN2020/105772
§ 371 (c)(1),
(2) Date: Jul. 15, 2022

(87) PCT Pub. No.: WO2021/143101
PCT Pub. Date: Jul. 22, 2021

(65) Prior Publication Data
US 2023/0080031 A1    Mar. 16, 2023

(30) Foreign Application Priority Data
Jan. 16, 2020    (CN) .......................... 202010051193.9

(51) Int. Cl.
*G06V 40/16*    (2022.01)
*G06N 3/045*    (2023.01)
(Continued)

(52) U.S. Cl.
CPC ........... *G06V 40/172* (2022.01); *G06N 3/045* (2023.01); *G06N 3/084* (2013.01); *G06V 10/82* (2022.01);
(Continued)

(58) Field of Classification Search
None
See application file for complete search history.

(56) References Cited

U.S. PATENT DOCUMENTS

| | | |
|---|---|---|
| 2006/0034495 A1 | 2/2006 | Miller et al. |
| 2016/0379041 A1 | 12/2016 | Rhee et al. |

(Continued)

FOREIGN PATENT DOCUMENTS

| | | |
|---|---|---|
| CN | 101980305 A | 2/2011 |
| CN | 105069622 A | 11/2015 |

(Continued)

OTHER PUBLICATIONS

Bicheng et al., "Principle and Application of Pattern Recognition," Xidian University Press, 2008, with an English abstract, 3 pages.

(Continued)

*Primary Examiner* — Jiangeng Sun
(74) *Attorney, Agent, or Firm* — SLATER MATSIL, LLP

(57) ABSTRACT

A face recognition method. The method includes: obtaining a face image to be recognized; extracting a face image feature based on the face image by using a pre-trained feature extraction network; extracting a plurality of facial geometric feature points from the face image to determine a plurality of feature point sets, where each of the plurality of feature point sets corresponds to one face part, and the feature point set includes at least one facial geometric feature point; obtaining a face topology structure feature based on the plurality of feature point sets, where the face topology structure feature is used to determine a relative location relationship between the plurality of feature point sets; and performing matching in a preset face database based on the face topology structure feature and the face image feature, to obtain a face recognition result.

20 Claims, 15 Drawing Sheets

(51) Int. Cl.
*G06N 3/084* (2023.01)
*G06V 10/82* (2022.01)

(52) U.S. Cl.
CPC .......... *G06V 40/165* (2022.01); *G06V 40/171* (2022.01)

(56) References Cited

U.S. PATENT DOCUMENTS

2017/0103538 A1* 4/2017 James ................ G06T 5/77
2021/0200994 A1* 7/2021 Chen ................ G06V 40/172

FOREIGN PATENT DOCUMENTS

| | | | | |
|---|---|---|---|---|
| CN | 106022317 | A | 10/2016 | |
| CN | 106686353 | A | 5/2017 | |
| CN | 106998444 | A * | 8/2017 | ......... G06K 9/00228 |
| CN | 108898068 | A | 11/2018 | |
| CN | 110222566 | A | 9/2019 | |
| CN | 110263673 | A | 9/2019 | |
| CN | 110675489 | A | 1/2020 | |
| CN | 111274916 | A * | 6/2020 | ............. G06N 3/084 |
| CN | 109583332 | B * | 7/2021 | ......... G06K 9/00228 |
| WO | 2016011204 | A1 | 1/2016 | |

OTHER PUBLICATIONS

Komkov et al, "ADVHAT: Real-World Adversarial Attack on Arcface Face ID System," arXiv:1908.08705v1 [cs.CV], Aug. 23, 2019, 9 pages.

Labeled Faces in the Wild Home, LFW Face Database : Main, last updated: Jan. 9, 2018, 20:15 EST, URL:http://vis-www.cs.umass.edu/lfw/index.html#download, 15 pages.

* cited by examiner

FACE RECOGNITION METHOD AND FACE RECOGNITION APPARATUS

CROSS-REFERENCE TO RELATED APPLICATIONS

This application is a national stage of International Application No. PCT/CN2020/105772, filed on Jul. 30, 2020, which claims priority to Chinese Patent Application No. 202010051193.9, filed on Jan. 16, 2020. Both of the aforementioned applications are hereby incorporated by reference in their entireties.

TECHNICAL FIELD

This application relates to the field of artificial intelligence, and in particular, to a face recognition method and a face recognition apparatus.

BACKGROUND

Face recognition is a biometric recognition technology for performing identity recognition based on facial feature information of a person, and is important application in the field of artificial intelligence (artificial intelligence, AI). Face recognition uses analysis and comparison of visual feature information of a face to perform identity identification. With rapid development of computer and network technologies, a face recognition technology has been widely applied to many industries and fields, such as intelligent access control, intelligent locks, mobile terminals, public security, entertainment, and military.

Face recognition includes: collecting a face image, detecting a face in the image, and performing face image preprocessing on the detected face, then, extracting an image feature, and performing recognition and matching. The image feature extraction refers to extracting the image feature including a structure and texture from the image, the subsequent recognition and matching are completed based on the image feature, and completeness of the image feature is a key factor that affects success or failure of face recognition.

In the conventional technology, the image feature is extracted based on structure and texture information of an entire face image, and a face recognition effect depends on the completeness of the image feature. When the face image is interfered by an external environment, for example, has uneven light or is blocked by a hat, a scarf, or a mask, a part of the image feature is lost, incompleteness of the image feature results in a low success rate of face recognition.

SUMMARY

Embodiments of this application provide a face recognition method, used to recognize a face image, especially a face image that is blocked, to improve a success rate of face recognition.

A first aspect of embodiments of this application provides a face recognition method. The method includes: obtaining a face image to be recognized; extracting a face image feature based on the face image by using a pre-trained feature extraction network; extracting a plurality of facial geometric feature points from the face image to determine a plurality of feature point sets, where each of the plurality of feature point sets corresponds to one face part, and the feature point set includes at least one facial geometric feature point; obtaining a face topology structure feature based on the plurality of feature point sets, where the face topology structure feature is used to determine a relative location relationship between the plurality of feature point sets; and performing matching in a preset face database based on the face topology structure feature and the face image feature, to obtain a face recognition result.

According to the face recognition method provided in embodiments of this application, in addition to the face image feature, the face topology structure feature is further extracted. The face topology structure feature is used to represent a topology structure between face parts, namely, a relative location relationship. The topology structure has a low dependency on completeness of an image. Therefore, a success rate of face recognition during blocking can be improved by performing matching and recognition jointly based on the face image feature and the face topology structure feature.

In a possible implementation of the first aspect, the face topology structure feature includes: a feature vector set, where a feature vector in the feature vector set is used to indicate a relative location relationship between any two of the plurality of feature point sets; or a feature matrix, where an element in the feature matrix is used to indicate a relative location relationship between any two of the plurality of feature point sets.

According to the face recognition method provided in embodiments of this application, the face topology structure feature can be directly obtained based on the plurality of feature point sets, and expressed in two forms: the feature vector set and the feature matrix.

In a possible implementation of the first aspect, the obtaining a face topology structure feature based on the plurality of face part feature point sets includes: constructing a mapping relationship between the plurality of feature point sets and a plurality of feature point sets of a standard face, where the mapping relationship is used to determine the relative location relationship between the plurality of feature point sets; and inputting the mapping relationship into a pre-trained face topology structure feature extraction network to obtain the face topology structure feature.

According to the face recognition method provided in embodiments of this application, a correspondence between feature points of the face image and feature points of the standard face is constructed, and a relative location relationship between the feature points in the face image and the relative location relationship between the plurality of feature point sets may be indirectly obtained based on mapping relationship data and known structure information of the standard face. The face topology structure feature can be extracted by inputting the mapping relationship data into a pre-training network.

In a possible implementation of the first aspect, the mapping relationship includes a distance and/or an angle between the plurality of feature point sets and the plurality of feature point sets of the standard face.

In a possible implementation of the first aspect, the face topology structure feature extraction network is obtained after a first network is trained. The method further includes: extracting a plurality of facial geometric feature points from a face image training sample to determine a plurality of sample feature point sets, where each of the plurality of sample feature point sets corresponds to one face part of the training sample, and the sample feature point set includes at least one facial geometric feature point; obtaining a mapping relationship between the sample feature point sets and the feature point sets of the standard face, and inputting the mapping relationship into the first network for training to obtain a first loss value; and updating a weight parameter in the first network based on the first loss value, to obtain the face topology structure feature extraction network.

According to the face recognition method provided in embodiments of this application, the face topology structure feature extraction network can be obtained by inputting topology structure data of the face image training sample for training.

In a possible implementation of the first aspect, the extracting a face image feature based on the face image by using a pre-trained feature extraction network includes: inputting the face image into a pre-trained global face feature extraction network to extract a global face feature.

According to the face recognition method provided in embodiments of this application, the face image feature may include the global face feature, and the global face feature is a global feature, for example, an image color feature or an image texture feature. Extracting of the global feature depends on completeness of an image. When a part of a face part in the face image is blocked, a success rate of recognition based on the extracted global feature is low. In this application, the face topology structure feature is combined for feature matching, to improve the success rate of face recognition.

In a possible implementation of the first aspect, the method further includes: extracting a first face part image from the face image. The extracting a face image feature based on the face image by using a pre-trained feature extraction network includes: inputting the first face part image into a pre-trained first part feature extraction network to extract a first part feature. The first part feature is used to perform matching in the face database to obtain the face recognition result.

According to the face recognition method provided in embodiments of this application, the face image feature may include an image feature of one face part, namely, a part feature. In this way, another form of the face image feature can be provided, and diversity of solution implementation is improved. The face part is, for example, an eye part, a nose part, or a mouth part.

In a possible implementation of the first aspect, the first part feature extraction network is obtained after a second network is trained. The method further includes: inputting a face part image extracted from the face image training sample into the second network for training to obtain a second loss value; and updating a weight parameter in the second network based on the second loss value, to obtain the first part feature extraction network.

According to the face recognition method provided in embodiments of this application, a face part feature extraction network can be obtained by inputting the face part image of the training sample for training.

In a possible implementation of the first aspect, the method further includes: extracting a plurality of face part images from the face image. The extracting a face image feature based on the face image by using a pre-trained feature extraction network includes: respectively inputting the plurality of face part images into a plurality of pre-trained part feature extraction networks to extract a plurality of part features; and determining a target part feature of the face image based on the plurality of part features.

According to the face recognition method provided in embodiments of this application, a plurality of face parts are extracted, and the plurality of part features can be separately extracted by using feature extraction networks for various face part, to improve the success rate of face recognition.

In a possible implementation of the first aspect, the target part feature is determined based on a weighted average value of the plurality of part features, and weight values of the plurality of part features are preset values.

According to the face recognition method provided in embodiments of this application, importance of a face part in face recognition is different. For example, importance of the eye part is higher than importance of an eyebrow part. In this solution, weights of features of different parts are preset, so that importance of different face parts can be distinguished, to improve the success rate of face recognition.

In a possible implementation of the first aspect, the method further includes: detecting whether face parts in the plurality of face part images are blocked; and determining, if a first face part in a first face part image is blocked, a second face part in a second face part image is not blocked, and the second face part is a symmetric part of the first face part, a horizontally flipped image of the second face part image as a restored image of the first face part. The restored image is used to be input into the part feature extraction network to extract the part feature.

According to the face recognition method provided embodiments of this application, whether a face part is blocked may be checked. If one part is blocked and a symmetric part of the part is not blocked, an image may be flipped for restoration and used in feature extraction, to improve the success rate of face recognition in a blocked scenario.

In a possible implementation of the first aspect, the method further includes: updating a weight value of a part feature of the first face part based on that the first face part is blocked. An updated first weight value is less than a preset first weight value of the first face part.

According to the face recognition method provided in embodiments of this application, a weight value of a part feature of a blocked face part can be reduced. Therefore, importance of the blocked part and importance of an unblocked part are effectively distinguished, to improve the success rate of face recognition in the blocked scenario.

In a possible implementation of the first aspect, the method further includes: preprocessing the face image to obtain a preprocessed face image. The preprocessing includes face alignment, and the preprocessed face image is used in extracting of the face image feature and extracting of the plurality of facial geometric feature points.

According to the face recognition method provided in embodiments of this application, before being used in feature extraction, the face image may be first preprocessed, to improve a feature extraction efficiency and feature accuracy.

A second aspect of embodiments of this application provides a face recognition apparatus. The apparatus includes: an obtaining module, configured to obtain a face image to be recognized; an extraction module, configured to extract a face image feature based on the face image by using a pre-trained feature extraction network; a determining module, configured to extract a plurality of facial geometric feature points from the face image to determine a plurality of feature point sets, where each of the plurality of feature point sets corresponds to one face part, the feature point set includes at least one facial geometric feature point, the obtaining module is further configured to obtain a face topology structure feature based on the plurality of feature point sets, and the face topology structure feature is used to determine a relative location relationship between the plurality of feature point sets; and a matching module, configured to perform matching in a preset face database based on the face topology structure feature and the face image feature, to obtain a face recognition result.

In a possible implementation of the second aspect, the face topology structure feature includes: a feature vector set, where a feature vector in the feature vector set is used to indicate a relative location relationship between any two of the plurality of feature point sets; or a feature matrix, where an element in the feature matrix is used to indicate a relative location relationship between any two of the plurality of feature point sets.

In a possible implementation of the second aspect, the determining module is further configured to construct a mapping relationship between the plurality of feature point sets and a plurality of feature point sets of a standard face. The mapping relationship is used to determine the relative location relationship between the plurality of feature point sets. The obtaining module is specifically configured to input the mapping relationship into a pre-trained face topology structure feature extraction network to obtain the face topology structure feature.

In a possible implementation of the second aspect, the mapping relationship includes a distance and/or an angle between the plurality of feature point sets and the plurality of feature point sets of the standard face.

In a possible implementation of the second aspect, the face topology structure feature extraction network is obtained after a first network is trained. The extraction module is further configured to extract a plurality of facial geometric feature points from a face image training sample to determine a plurality of sample feature point sets. Each of the plurality of sample feature point sets corresponds to one face part of the training sample, and the sample feature point set includes at least one facial geometric feature point. The obtaining module is further configured to obtain a mapping relationship between the sample feature point sets and the feature point sets of the standard face, and input the mapping relationship into the first network for training to obtain a first loss value. The obtaining module is further configured to update a weight parameter in the first network based on the first loss value, to obtain the face topology structure feature extraction network.

In a possible implementation of the second aspect, the extraction module is specifically configured to input the face image into a pre-trained global face feature extraction network to extract a global face feature.

In a possible implementation of the second aspect, the extraction module is specifically configured to: extract a first face part image from the face image; and input the first face part image into a pre-trained first part feature extraction network to extract a first part feature, where the first part feature is used to perform matching in the face database to obtain the face recognition result.

In a possible implementation of the second aspect, the first part feature extraction network is obtained after a second network is trained. The obtaining module is further configured to input a face part image extracted from the face image training sample into the second network for training to obtain a second loss value. The obtaining module is further configured to update a weight parameter in the second network based on the second loss value, to obtain the first part feature extraction network.

In a possible implementation of the second aspect, the extraction module is further configured to extract a plurality of face part images from the face image. The extraction module is specifically configured to respectively input the plurality of face part images into a plurality of pre-trained part feature extraction networks to extract a plurality of part features. The determining module is further configured to determine a target part feature of the face image based on the plurality of part features.

In a possible implementation of the second aspect, the target part feature is determined based on a weighted average value of the plurality of part features, and weight values of the plurality of part features are preset values.

In a possible implementation of the second aspect, the face recognition apparatus further includes a detection module, configured to detect whether face parts in the plurality of face part images are blocked. The determining module is further configured to determine, if a first face part in a first face part image is blocked, a second face part in a second face part image is not blocked, and the second face part is a symmetric part of the first face part, a horizontally flipped image of the second face part image as a restored image of the first face part. The restored image is used to be input into the part feature extraction network to extract the part feature.

In a possible implementation of the second aspect, the face recognition apparatus further includes an updating module, configured to update a weight value of a part feature of the first face part based on that the first face part is blocked. An updated first weight value is less than a preset first weight value of the first face part.

In a possible implementation of the second aspect, the obtaining module is further configured to preprocess the face image to obtain a preprocessed face image. The preprocessing includes face alignment, and the preprocessed face image is used in extracting of the face image feature and extracting of the plurality of facial geometric feature points.

A second aspect of embodiments of this application provides a face recognition apparatus. The apparatus includes a processor and a memory. The processor and the memory are connected to each other, the memory is configured to store a computer program, and the computer program includes program instructions. The processor is configured to invoke the program instructions to perform the method according to any one of the first aspect and the possible implementations.

A third aspect of embodiments of this application provides a computer program product including instructions. When the computer program product runs on a computer, the computer is enabled to perform the method according to any one of the first aspect and the possible implementations.

A fourth aspect of embodiments of this application provides a computer-readable storage medium, including instructions. When the instructions are run on a computer, the computer is enabled to perform the method according to any one of the first aspect and the possible implementations.

A fifth aspect of embodiments of this application provides a chip, including a processor. The processor is configured to read and execute a computer program stored in a memory, to perform the method in any possible implementation of any one of the foregoing aspects. Optionally, the chip includes the memory, and the memory and the processor are connected by using a circuit or a wire. Further, optionally, the chip further includes a communication interface, and the processor is connected to the communication interface. The communication interface is configured to receive data and/or information that needs to be processed. The processor obtains the data and/or the information from the communication interface, processes the data and/or the information, and outputs a processing result through the communication interface. The communication interface may be an input/output interface.

It can be learned from the foregoing technical solutions that embodiments of this application have the following advantages:

According to the face recognition method provided in embodiments of this application, the face image is input into the pre-trained feature extraction network to obtain the face image feature. In addition, the plurality of facial geometric feature points are extracted from the face image to determine a plurality of face part feature point sets corresponding to a plurality of face parts, and the face topology structure feature is obtained based on the plurality of face part feature point sets. Feature matching is performed in the face database based on the face topology structure feature and the face image feature, to finally obtain the face recognition result. Because a face topology structure is constructed based on a relative location relationship of the plurality of face part feature point sets, more structured information can be extracted and obtained, dependency on completeness of an entire face image is reduced, and impact of blocking on face recognition can be effectively reduced.

DETAILED DESCRIPTION OF ILLUSTRATIVE EMBODIMENTS

Figure 1:
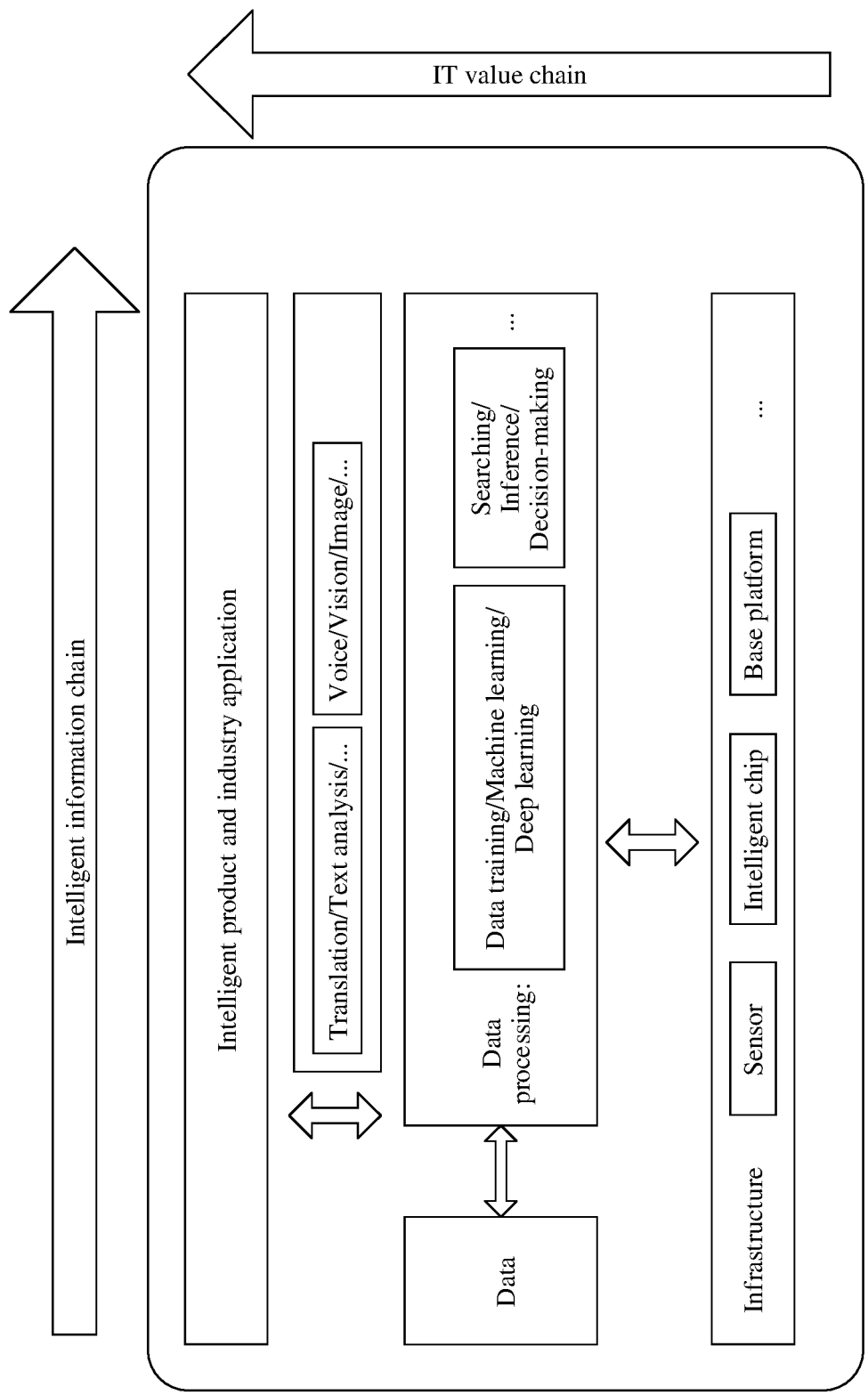
FIG. 1 is a schematic diagram of a main framework of artificial intelligence according to an embodiment of this application.

Embodiments of this application provide a face recognition method, used to recognize a face image, especially a face image that is blocked, to improve a success rate of face recognition.

Brief introduction to terms in this application is as follows:

Face image: The face image is an image that includes face information.

Facial geometric features: A face includes parts such as eyes, a nose, and a mouth. Geometric descriptions of shapes and structural relationships of these parts can be used as important features for face recognition. These features are the facial geometric features.

Facial geometric feature point: A face includes parts such as eyes, a nose, and a mouth. A feature point, namely, a facial geometric feature point, used to represent each face part, may be extracted by detecting a face image.

Face part image: A face part image refers to an image that includes a characteristic local area in a face image, and generally refers to an image of a part, for example, an eye, an eyebrow, a nose, or a mouth.

Face topology structure: A topology is a method in which entities are abstracted into points that are irrelevant to their sizes and shapes, lines, that connect the entities, are abstracted into lines, and a relationship between these points and these lines is represented in a form of a graph. The purpose of the topology is to study a connection relationship between these points and these lines. A graph for representing the relationship between the points and the lines is referred to as a topology diagram. A topological structure and a geometrical structure belong to two different mathematical concepts. In the geometrical structure, we need to examine a location relationship between a point and a line, or the geometrical structure emphasizes a shape and a size formed by a point and a line. For example, a trapezoid, a square, a parallelogram, and a circle all belong to different geometric structures. However, from a perspective of a topology structure, because connection relationships between points and lines are the same, they have a same topology structure, namely, a ring structure. In other words, different geometric structures may have a same topology structure. The face topology structure includes a connection relationship between various parts of a face.

The following describes embodiments of this application with reference to the accompanying drawings. It is clear that the described embodiments are merely some rather than all of embodiments of this application. A person of ordinary skill in the art may learn that, with technology development and emergence of a new scenario, the technical solutions provided in embodiments of this application are also applicable to a similar technical problem.

In the specification, claims, and accompanying drawings of this application, terms "first", "second", and the like are intended to distinguish between similar objects but do not necessarily indicate a specific order or sequence. It should be understood that data termed in such a way are interchangeable in appropriate circumstances, so that embodiments described herein can be implemented in other orders than the order illustrated or described herein. In addition, terms "include", "have", and any variations thereof are intended to cover non-exclusive inclusions, for example, a process, method, system, product, or device including a series of steps or modules is not necessarily limited to those clearly listed steps or modules, but may include other steps or modules that are not clearly listed or are inherent to such a process, method, product, or device. Naming or numbering of steps in this application does not mean that the steps in a method procedure need to be performed in a time/logical order indicated by the naming or numbering. An execution order of the steps in the procedure that have been named or numbered can be changed based on a technical objective to be achieved, provided that same or similar technical effects can be achieved.

FIG. 1 is a schematic diagram of a main framework of artificial intelligence. The main framework describes an overall working procedure of an artificial intelligence system, and is applicable to a general requirement of the field of artificial intelligence.

The following describes the foregoing main framework of artificial intelligence from two dimensions: an "intelligent information chain" (a horizontal axis) and an "IT value chain" (a vertical axis).

The "intelligent information chain" reflects a series of processes from data obtaining to data processing. For example, the process may be a general process of intelligent information perception, intelligent information representation and formation, intelligent inference, intelligent decision-making, and intelligent execution and output. In this process, data undergoes a condensation process of "data-information-knowledge-wisdom".

The "IT value chain" reflects a value brought by artificial intelligence to the information technology industry from an underlying infrastructure and information (providing and processing technology implementation) of human intelligence to an industrial ecological process of a system.

(1) Infrastructure

The infrastructure provides computing capability support for the artificial intelligence system, implements communication with the external world, and implements support by using a base platform. A sensor is configured to communicate with the outside. A computing capability is provided by an intelligent chip (a hardware acceleration chip, for example, a CPU, an NPU, a GPU, an ASIC, or an FPGA). The base platform includes related platform assurance and support such as a distributed computing framework and a network, and may include cloud storage and computing, an interconnection and interworking network, and the like. For example, the sensor communicates with the outside to obtain data, and the data is provided to an intelligent chip in a distributed computing system for computation, where the distributed computing system is provided by the base platform.

(2) Data

Data from a higher layer of the infrastructure indicates a data source in the field of artificial intelligence. The data relates to a graph, an image, a voice, and text, further relates to internet of things data of a conventional device, and includes service data of an existing system and perception data such as force, displacement, a liquid level, a temperature, and humidity.

(3) Data Processing

Data processing usually includes manners such as data training, machine learning, deep learning, searching, inference, and decision-making.

Machine learning and deep learning may perform symbolized and formalized intelligent information modeling, extracting, preprocessing, training, and the like on data.

Inference refers to a process in which a human intelligent inferring manner is simulated in a computer or an intelligent system, and machine thinking and problem solving are performed by using formal information according to an inferring control policy. A typical function is searching and matching.

Decision-making refers to a process in which a decision is made after intelligent information is inferred, and usually provides functions such as classification, ranking, and prediction.

(4) General Capabilities

After data processing mentioned above is performed on data, some general capabilities may be further formed based on a data processing result, for example, an algorithm or a general system, such as translation, text analysis, computer vision processing, speech recognition, and image recognition.

(5) Intelligent Product and Industry Application

Intelligent products and industry applications refer to products and applications of the artificial intelligence system in various fields, and are package of an overall solution of artificial intelligence. Decision making for intelligent information is productized and an application is implemented. Application fields mainly include intelligent manufacturing, intelligent transportation, smart home, smart health care, intelligent security protection, autonomous driving, a safe city, an intelligent terminal, and the like.

Figure 2:
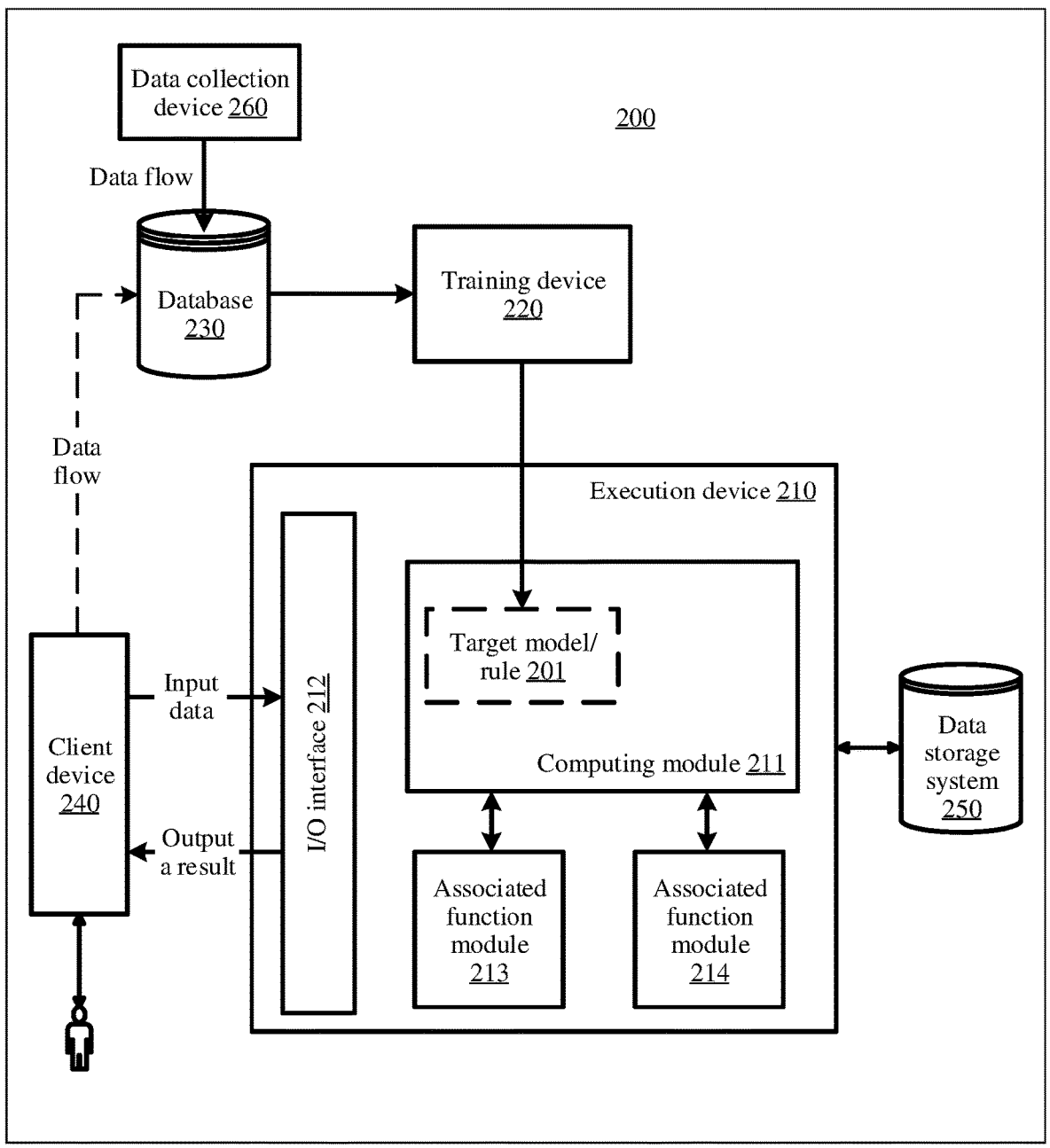
FIG. 2 is a schematic diagram of an application environment according to an embodiment of this application.

Refer to FIG. 2. An embodiment of this application provides a system architecture 200. A data collection device 260 is configured to collect face image data and store the face image data in a database 230. A training device 220 generates a target model/rule 201 based on the face image data maintained in the database 230. The following describes in more detail how the training device 220 obtains the target model/rule 201 based on the face image data. The target model/rule 201 can be used in application scenarios such as face recognition, image classification, and virtual reality.

In this embodiment of this application, training may be performed based on the face image data. Specifically, the data collection device 260 may be configured to collect various face images, including a face image that is blocked, and store the face images in the database 230. In addition, the face image data may be alternatively directly obtained from a common database, for example, an LFW database, a YaleB database, a CMU PIE database, a CFW database or a Celeba database.

The target model/rule 201 may be obtained based on a deep neural network. The following describes the deep neural network.

Work of each layer in the deep neural network may be described by using a mathematical expression: $\vec{y}=a(W \cdot \vec{x}+b)$. The work of each layer in the deep neural network may be physically understood as completing transformation from input space to output space (namely, row space to column space of a matrix) by performing five operations on the input space (a set of input vectors). The five operations include: 1. dimension raising/dimension reduction, 2. scaling out/scaling in, 3. rotation, 4. translation, and 5. "bending". The operations 1, 2, and 3 are performed by $W \cdot \vec{x}$, the operation 4 is performed by +b, and the operation 5 is performed by a( ). The word "space" is used herein for expression because classified objects are not single things, but a type of things. Space refers to a collection of all individuals of such type of things. W is a weight vector, and each value in the vector represents a weight value of one neuron in the neural network at this layer. The vector W determines space transformation from the input space to the output space described above. In other words, a weight W of each layer controls how to transform space. A purpose of training the deep neural network is to finally obtain a weight matrix (a weight matrix formed by vectors W of a plurality of layers) of all layers of a trained neural network. Therefore, a training process for the neural network is essentially a manner of learning control of space transformation, and more specifically, learning a weight matrix.

Because an output of the deep neural network is expected to be as much as possible close to a value that actually wants to be predicted, a current predicted value of the network and an expected target value are compared, so that a weight vector of each layer of the neural network can be updated based on a difference between the predicted value and the target value (certainly, there is usually an initialization process before first updating, to be specific, a parameter is preconfigured for each layer of the deep neural network). For example, if the predicted value of the network is large, the weight vector is adjusted to obtain a smaller predicted value, and is continuously adjusted until the neural network can predict the expected target value. Therefore, "how to obtain, through comparison, a difference between the predicted value and the target value" needs to be predefined. This is a loss function (loss function) or an objective function (objective function). The loss function and the objective function are important equations that measure the difference between the predicted value and the target value. The loss function is used as an example. A higher output value (loss) of the loss function indicates a larger difference. Therefore, training of the deep neural network becomes a process of reducing the loss as much as possible.

The target model/rule obtained by the training device 220 may be applied to different systems or devices. In FIG. 2, an I/O interface 212 is configured for an execution device 210, to exchange data with an external device. A "user" may input data into the I/O interface 212 by using a client device 240.

The execution device 210 may invoke data, code, and the like in a data storage system 250, or may store data, instructions, and the like in the data storage system 250.

A computing module 211 uses the target model/rule 201 to process the input data. Face image recognition is used as an example. The computing module 211 may parse the input face image to obtain an image feature, for example, texture information, in the face image.

An associated function module 213 may preprocess the image data in the computing module 211, for example, perform face image preprocessing, including face alignment.

An associated function module 214 may preprocess the image data in the computing module 211, for example, perform face image preprocessing, including face alignment.

Finally, the I/O interface 212 returns a processing result to the client device 240, and provides the processing result for the user.

More deeply, the training device 220 may generate, for different targets, corresponding target models/rules 201 based on different data, to provide a better result for the user.

In a case shown in FIG. 2, the user may manually specify data to be input into the execution device 210, for example, may operate on an interface provided by the I/O interface 212. In another case, the client device 240 may automatically input data into the I/O interface 212 and obtain a result. If the client device 240 needs to obtain permission of the user for automatically inputting the data, the user may set corresponding permission on the client device 240. The user may view, on the client device 240, a result output by the execution device 210, and a specific presentation form may be a specific manner, for example, display, a sound, or an action. The client device 240 may be also used as a data collection end to store the collected training data in the database 230.

It should be noted that FIG. 2 is merely a schematic diagram of a system architecture according to an embodiment of this application. A location relationship between devices, components, modules, and the like shown in the figure does not constitute any limitation. For example, in FIG. 2, the data storage system 250 is an external storage device relative to the execution device 210, and in another case, the data storage system 250 may be alternatively disposed in the execution device 210.

A convolutional neural network (convolutional neuron network, CNN) is a deep neural network with a convolutional structure, and is a deep learning (deep learning) architecture. In the deep learning architecture, multi-layer learning is performed on different abstract levels by using a machine learning algorithm. As the deep learning architecture, the CNN is a feed-forward (feed-forward) artificial neural network. Image processing is used as an example. Neurons in the feed-forward artificial neural network respond to an overlapping area in an image input into the CNN.

Figure 3:
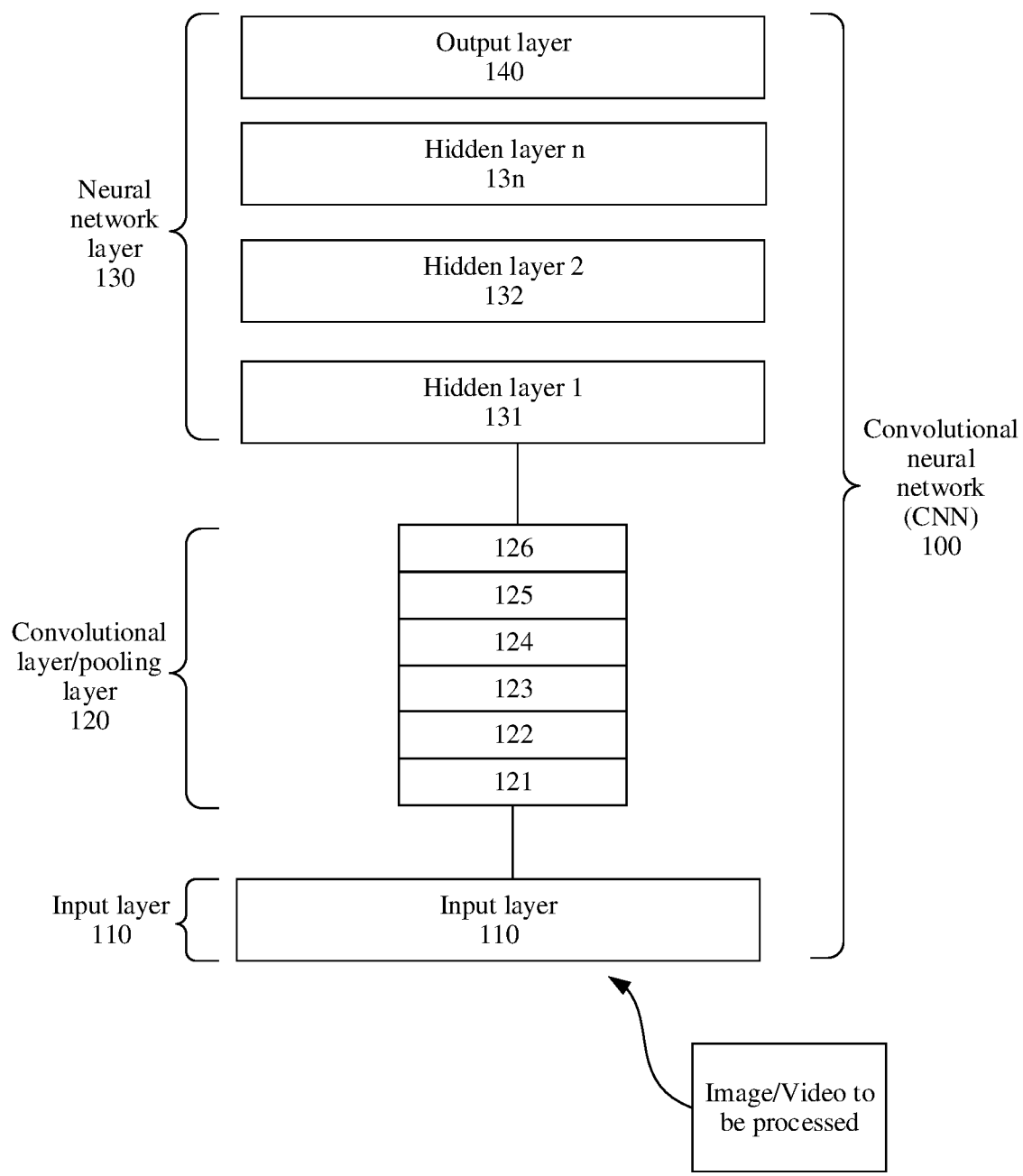
FIG. 3 is a schematic diagram of a structure of a convolutional neural network according to an embodiment of this application.

As shown in FIG. 3, a convolutional neural network (CNN) 100 may include an input layer 110, a convolutional layer/pooling layer 120, and a neural network layer 130. The pooling layer is optional.

Convolutional Layer/Pooling Layer 120:

Convolutional Layer:

As shown in FIG. 3, for example, the convolutional layer/pooling layer 120 may include layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layer 121 and the layer 122 are convolutional layers, the layer 123 is a pooling layer, the layer 124 and the layer 125 are convolutional layers, and the layer 126 is a pooling layer. In other words, an output of a convolutional layer may be used as an input for a subsequent pooling layer, or may be used as an input for another convolutional layer, to continue to perform a convolution operation.

The convolutional layer 121 is used as an example. The convolutional layer 121 may include a plurality of convolution operators. A convolution operator is also referred to as a kernel. In image processing, the convolution operator functions as a filter that extracts specific information from an input image matrix. The convolution operator may be essentially a weight matrix, and the weight matrix is usually predefined. In a process of performing a convolution operation on an image, the weight matrix is usually used to process pixels at a granularity level of one pixel (or two pixels, which depends on a value of a stride (stride)) in a horizontal direction on the input image, to extract a specific feature from the image. A size of the weight matrix should be related to a size of the image. It should be noted that a depth dimension (depth dimension) of the weight matrix is the same as a depth dimension of the input image. During a convolution operation, the weight matrix extends to an entire depth of the input image. Therefore, a convolution output of a single depth dimension is generated by performing convolution with a single weight matrix. However, in most cases, a plurality of weight matrices of a same dimension rather than the single weight matrix are used. Outputs of the weight matrices are stacked to form a depth dimension of a convolutional image. Different weight matrices may be used to extract different features of the image. For example, one weight matrix is used to extract edge information of the image, another weight matrix is used to extract a specific color of the image, still another weight matrix is used to blur an unnecessary noise in the image, and so on. Because the plurality of weight matrices have the same dimension, feature maps extracted by using the plurality of weight matrices with the same dimension also have a same dimension. Then, the plurality of extracted feature maps with the same dimension are combined to form an output of the convolution operation.

Weight values in these weight matrices need to be obtained in an actual application through massive training. The weight matrices that are formed based on the weight values obtained through training may be used to extract information from the input image, to help the convolutional neural network 100 perform correct prediction.

When the convolutional neural network 100 includes a plurality of convolutional layers, a larger quantity of general features are usually extracted at an initial convolutional layer (for example, the convolutional layer 121). The general features may be also referred to as low-level features. As a depth of the convolutional neural network 100 increases, a feature extracted at a more subsequent convolutional layer (for example, the convolutional layer 126) is more complex, for example, a high-level semantic feature. A feature with higher semantics is more applicable to a to-be-resolved problem.

Pooling Layer:

Because a quantity of training parameters usually needs to be reduced, the pooling layer usually needs to be periodically introduced after a convolutional layer. To be specific, for the layers 121 to 126 in the convolutional layer/pooling layer 120 shown in FIG. 3, one convolutional layer may be followed by one pooling layer, or a plurality of convolutional layers may be followed by one or more pooling layers. During image processing, the pooling layer is only used for reducing a space size of the image. The pooling layer may include an average pooling operator and/or a maximum pooling operator, to perform sampling on an input image to obtain an image with a small size. The average pooling operator may compute a pixel value in the image within a specific range, to generate an average value. The maximum pooling operator may be used for selecting a pixel with a largest value within a specific range as a maximum pooling result. In addition, similar to a case in which a size of a weight matrix in the convolutional layer should be related to a size of the image, an operator in the pooling layer should be also related to the size of the image. A size of a processed image output from the pooling layer may be less than a size of an image input into the pooling layer. Each pixel in the image output from the pooling layer represents an average value or a maximum value of a corresponding sub-area of the image input into the pooling layer.

Neural Network Layer 130:

After processing is performed at the convolutional layer/pooling layer 120, the convolutional neural network 100 still cannot output required output information. As described above, at the convolutional layer/pooling layer 120, only a feature is extracted, and parameters resulting from an input image are reduced. However, to generate final output information (required type information or other related information), the convolutional neural network 100 needs to use the neural network layer 130 to generate an output of a quantity of one required type or one group of required types. Therefore, the neural network layer 130 may include a plurality of hidden layers (131, 132, ..., and 13n shown in FIG. 3) and an output layer 140. Parameters included in the plurality of hidden layers may be obtained through pre-training based on related training data of a specific task type. For example, the task type may include image recognition, image classification, super-resolution image reconstruction, and the like.

The plurality of hidden layers included in the neural network layer 130 are followed by the output layer 140, namely, the last layer of the entire convolutional neural network 100. The output layer 140 has a loss function similar to a categorical cross entropy, and the loss function is specifically used to compute a prediction error. Once forward propagation (for example, propagation from the layers 110 to 140 in FIG. 3 is forward propagation) of the entire convolutional neural network 100 is completed, reverse propagation (for example, propagation from the layers 140 to 110 in FIG. 3 is reverse propagation) is started to update weight values and deviations of the layers mentioned above, to reduce a loss of the convolutional neural network 100 and an error between a result output by the convolutional neural network 100 by using the output layer and an ideal result.

It should be noted that the convolutional neural network 100 shown in FIG. 3 is merely used as an example of a convolutional neural network. During specific application, the convolutional neural network may alternatively exist in a form of another network model, for example, a plurality of parallel convolutional layers/pooling layers shown in FIG. 4, and extracted features are all input into the entire neural network layer 130 for processing.

Figure 5:
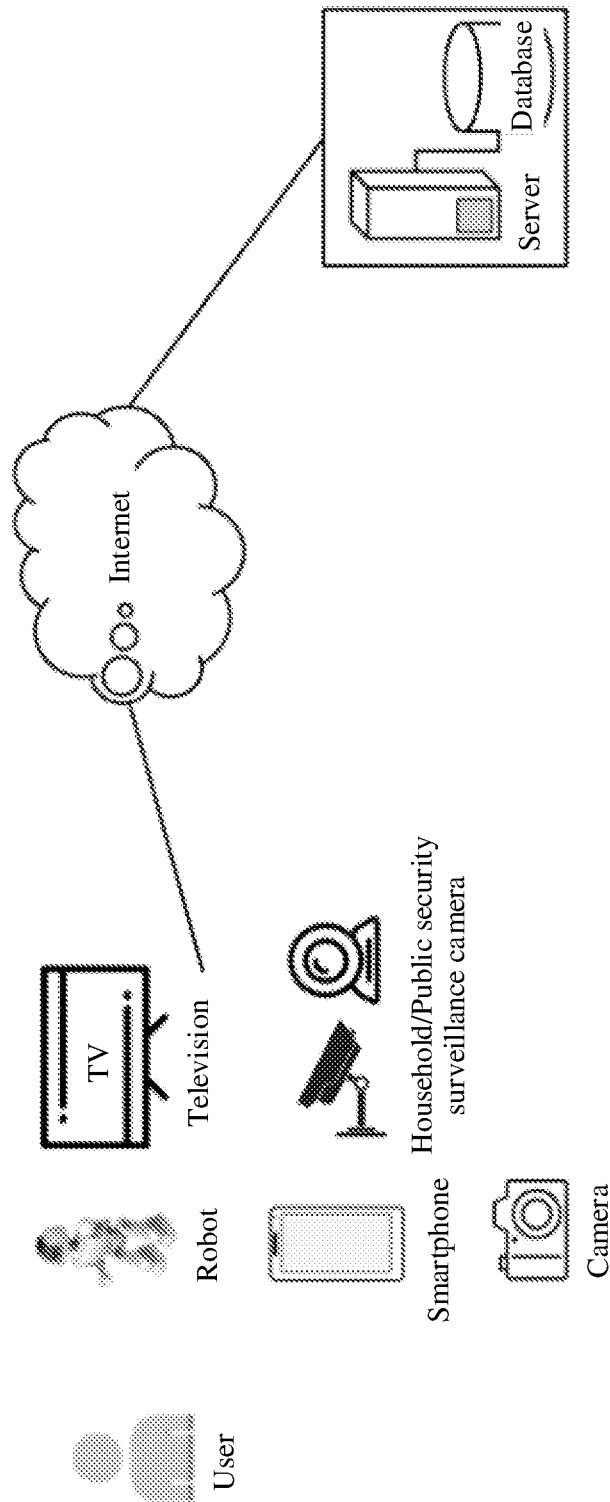
FIG. 5 is a diagram of a system architecture according to an embodiment of this application.

The following describes a diagram of a system architecture for a face recognition method according to an embodiment of this application with reference to FIG. 5.

The face recognition method provided in this embodiment of this application is applicable to face recognition in various scenarios such as home and security protection, including use scenarios such as identity verification, personalized customization, and expression simulation of products such as a robot, a smartphone, a desktop computer, a tablet computer, a television, a household or public security surveillance camera, a camera, an access control system, a door lock, an attendance machine, and smart glasses. A face recognition process may be completed by the foregoing entities, or may be completed by a dedicated server by connecting the foregoing entities to the dedicated server through a network. This is not specifically limited herein.

In a scenario in which the server is used to perform face recognition, the network includes one or more of a plurality of types of wireless or partially wireless communication networks, for example, a local area network (LAN), a wireless local area network (WLAN), a personal area network (PAN), a wide area network (WAN), an intranet, the Internet, a peer-to-peer network, a point-to-point network, or a mesh-bonding network. This is not specifically limited herein.

Figure 6:
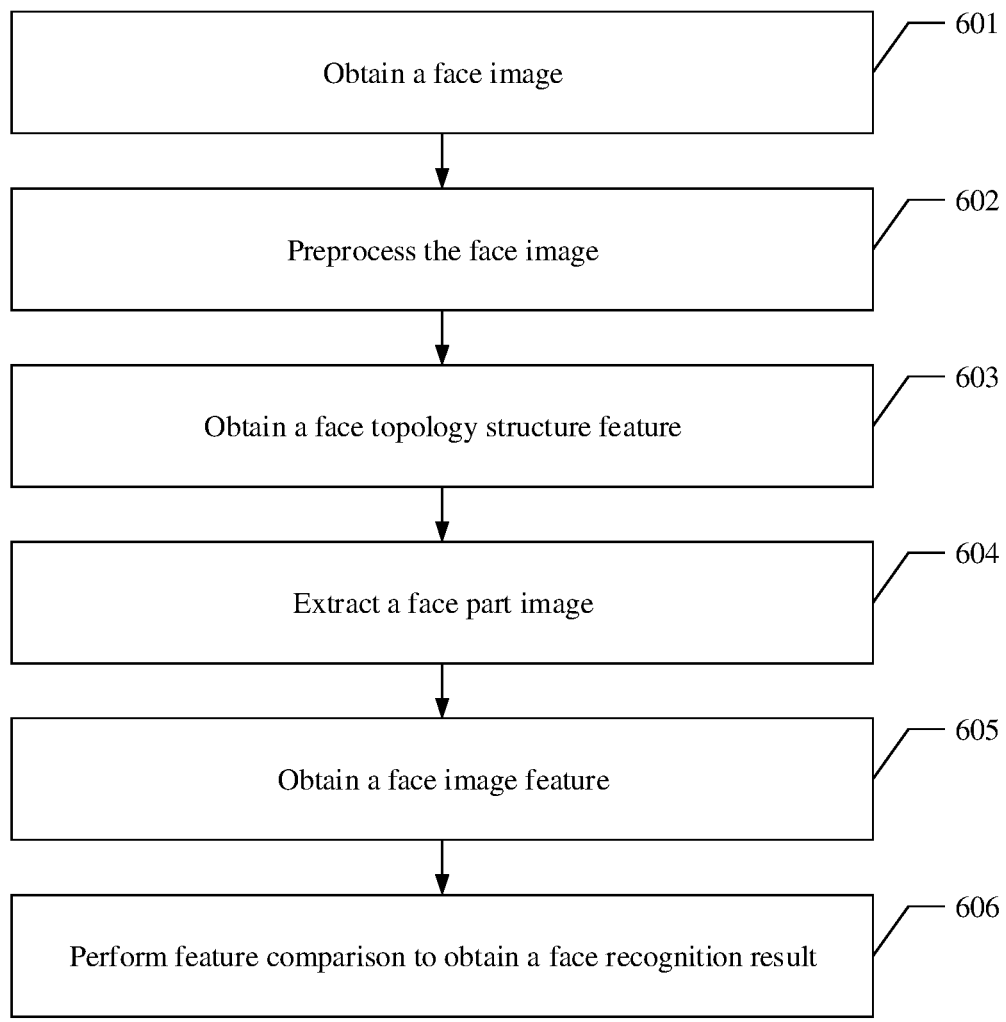
FIG. 6 is a schematic diagram of an embodiment of a face recognition method according to an embodiment of this application.

The following describes in detail a face recognition method according to an embodiment of this application with reference to FIG. 6.

601: Obtain a face image.

A face recognition apparatus obtains the face image. Optionally, the face recognition apparatus shoots an image by using a built-in or peripheral camera, and then detects the face image including face information from the shot image.

For example, a robot may obtain the face image by collecting an image by using a camera and detecting that the image includes a face.

602: Preprocess the face image.

The face recognition apparatus preprocesses the face image. An original face image cannot be directly used due to restrictions and random interference of various conditions. Image preprocessing such as grayscale correction and noise filtering need to be performed on the original face image at an early stage of image processing to obtain a preprocessed image for subsequent feature extraction.

The face image preprocessing may include face alignment, light compensation, grayscale transformation, histogram equalization, normalization processing, georectification, median filtering, sharpening, and the like. A specific processing procedure is not limited herein. Normalization processing is used to obtain standardized face images with a same size and a same grayscale value range, and median filtering may be used to perform a smoothing operation on the image to eliminate noise.

Optionally, face alignment processing is performed on the face image, and faces of different scales and in different directions are normalized to a unified scale based on locations of face feature points to obtain an image with a positive face location. The face alignment includes:

1. Face frames are normalized to a unified scale. A range of a face in an image may be identified by a face frame area. A size of the face frame is related to a distance between a human body and a camera during image shooting. If the distance is short, a face is large. If the distance is long, a face is small. The face frames can be normalized to the unified scale through face alignment to facilitate subsequent feature extraction.

2. Face rotation: Because a person in a face image may have different postures, for example, a detected face may be a front face, or may be a side face, face rotation is performed through face alignment, and faces with different postures are rotated to a same angle as much as possible for ease of recognition. Optionally, the faces are rotated to a front direction of a nose.

Face alignment can reduce impact of the distance or the posture on subsequent feature extraction, to recognize the faces on a unified scale.

603: Obtain a face topology structure feature.

The face recognition apparatus detects facial geometric feature points in a face image to be recognized. The facial geometric feature points include feature points used to represent face parts, for example, eyes, a nose, a mouth, and a facial contour.

Figure 7:
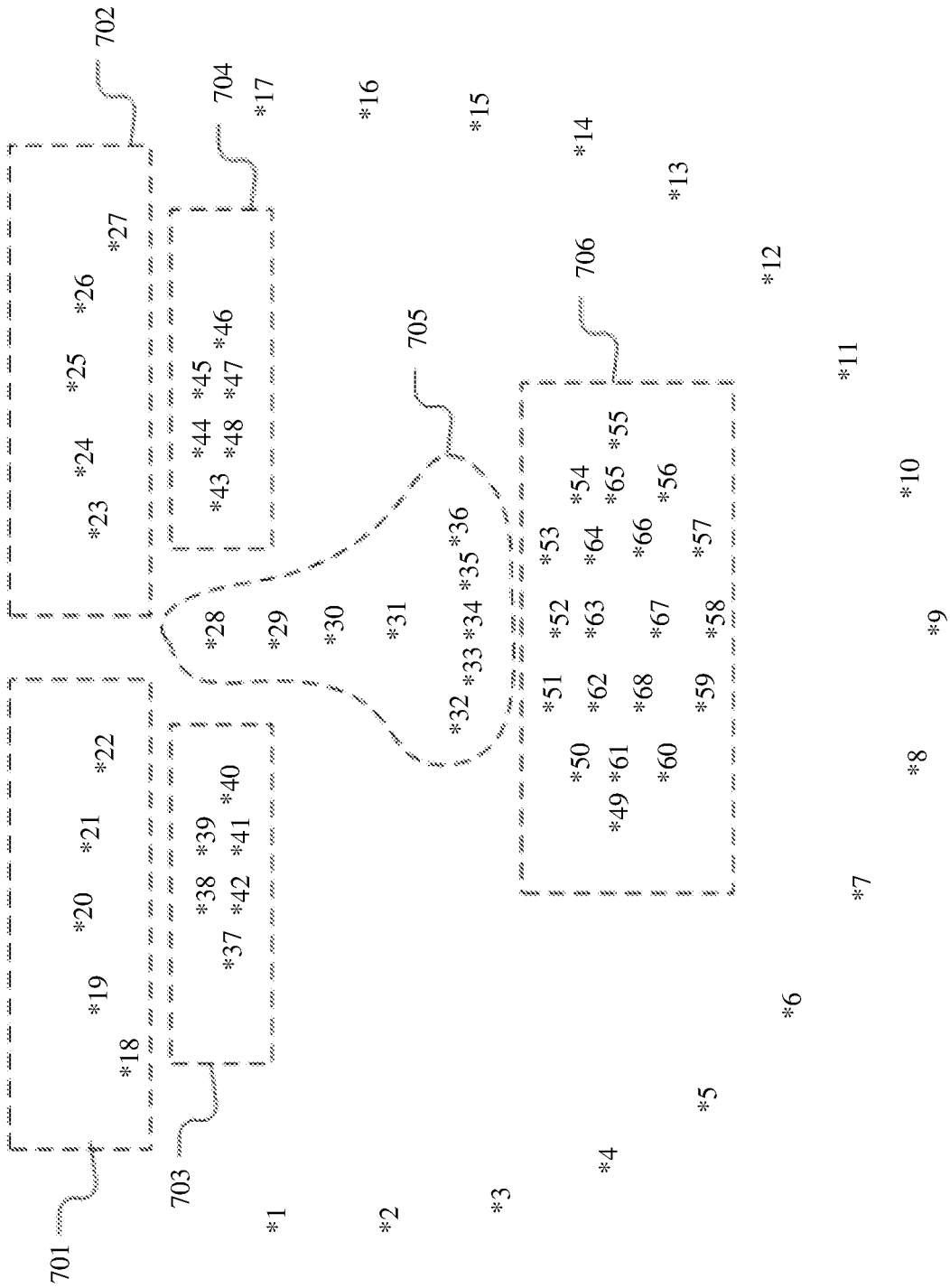
FIG. 7 is a schematic diagram of a feature point of a target set according to an embodiment of this application.

The face recognition apparatus may detect the facial geometric feature points by using a preset algorithm. A specific type of the preset algorithm is not limited herein. In addition, a quantity of extracted facial geometric feature points is not limited, and 68 feature points or 128 feature points may be extracted. For example, FIG. 7 is a schematic diagram of facial geometric feature points according to an embodiment of this application. The figure shows 68 facial geometric feature points.

A plurality of face part feature point sets may be determined based on target geometric feature points. For example, in FIG. 7, a face part feature point set including facial geometric feature points 18 to 22 is used to indicate a left eyebrow part 701. A face part feature point set including facial geometric feature points 23 to 27 is used to indicate a right eyebrow part 702. A face part feature point set including facial geometric feature points 37 to 42 is used to indicate a left eye part 703. A face part feature point set including facial geometric feature points 43 to 48 is used to indicate a right eye part 704. A face part feature point set including facial geometric feature points 28 to 36 is used to indicate a nose part 705. A face part feature point set including facial geometric feature points 49 to 68 is used to indicate a mouth part 706.

A relative location relationship of various parts of a face is fixed, and the parts are divergently distributed by taking the nose as a center, so that a connection relationship between the face part feature point sets is computed by using prior information and the detected facial geometric feature points, to construct a face topology structure and obtain the face topology structure feature.

There are a plurality of methods for obtaining the face topology structure feature.

Figure 8:
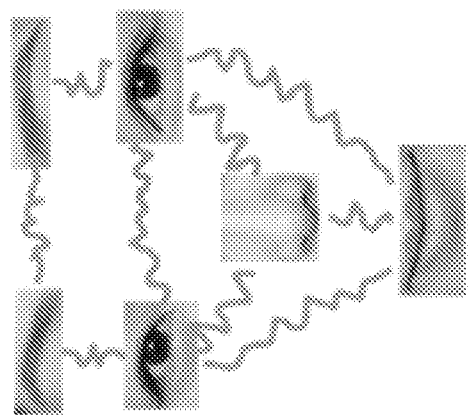
FIG. 8 is a schematic diagram of a face topology structure according to an embodiment of this application.
Figure 8:
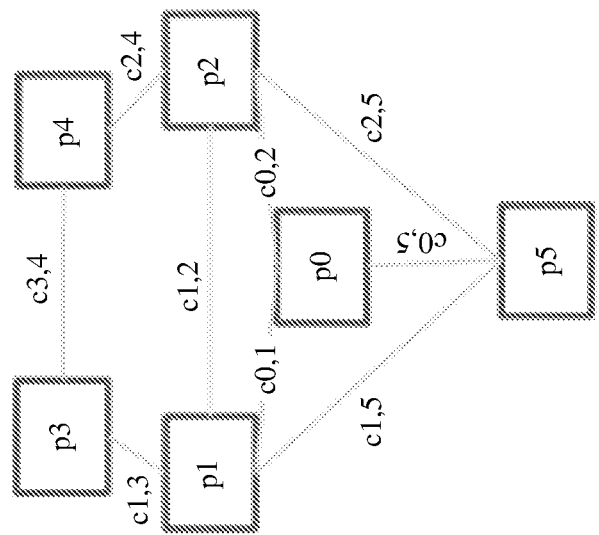

Optionally, the face topology structure feature is represented as a feature vector set, and a feature vector in the feature vector set is used to indicate a relative location relationship between any two of the plurality of face part feature point sets. FIG. 8 is a schematic diagram of a face topology structure according to an embodiment of this application.

P represents a face part feature point set, a vector $c_{i,j}$ represent a connection relationship between face part feature point sets i and j.

The face topology structure is represented as [$c0,1$, $c0,2$, $c0,5$, $c1,2$, $c1,3$, $c3,4$, $c2,4$, $c2,5$, $c1,5$]. For example, the vector $c0,1$ may be obtained based on location coordinates of P0 and location coordinates of P1. A vector representation method only lists a feature relationship having a connection relationship. It may be understood that a connection relationship between two face parts that do not directly have a connection relationship may be also indirectly obtained based on topology structure information.

Normalization is performed on face structure features. Normalization refers to using a unified measurement unit and measurement standard for a feature. For example, the nose is used as an origin, and a distance from an eye to the nose is $C0,1$. The distance may use an image coordinate system as a computing system, or the distance may be further normalized to a value between 0 and 1.

Optionally, the face topology structure feature is represented as a feature matrix. An element in the feature matrix is used to indicate a relative location relationship between any two of the plurality of face part feature point sets. As shown below, $c_{ij}$ that has no connection relationship is 0. For example, there is no connection relationship between p1 and p4 in the foregoing figure, and $C1,4$ may be represented as 0.

$$\begin{pmatrix} c_{0,0} & \cdots & c_{0,5} \\ \vdots & \ddots & \vdots \\ c_{5,0} & \cdots & c_{5,5} \end{pmatrix}$$

It should be noted that, in addition to a connection relationship shown in FIG. 8, another connection relationship may be defined, for example, a Euclidean distance, curvature, or angle. This is not specifically limited herein.

Optionally, a mapping relationship between the plurality of face part feature point sets and face part feature point sets of a standard face is constructed, and the mapping relationship is input into a pre-trained face topology structure feature extraction network to obtain the face topology structure feature. A mapping relationship between each face part in the face image and each corresponding face part in a standard face may be expressed by using a measurement relationship, for example, a distance and/or an angle, and is used to indicate a relative location relationship between the plurality of face part feature point sets.

Figure 9:
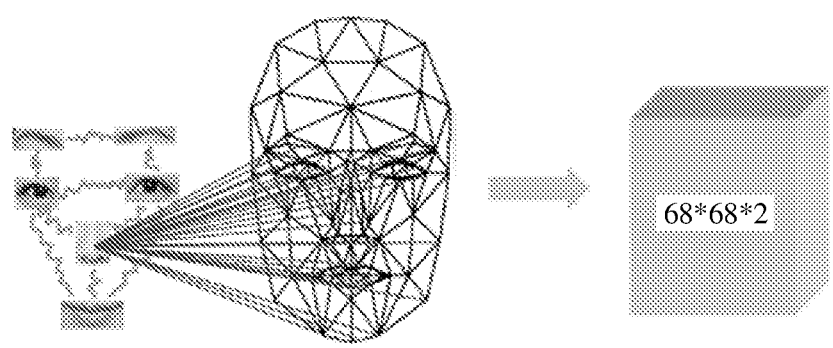
FIG. 9 is a schematic diagram of a structure of a standard face according to an embodiment of this application.

The standard face is a face image used as a reference standard. Refer to FIG. 9, on the middle standard face, at least one feature point is marked on parts such as the eyes, the nose, the eyebrows, and the mouth. For example, the nose may be marked by using one feature point, or may be marked by using a plurality of feature points. A quantity of feature points marked on each part is not specifically limited, and may be specified by a developer. In a case in which a topology structure of feature points of the standard face is known, a location relationship between all feature points in the face image to be recognized and the relative location relationship between the plurality of face part feature point sets may be determined based on a mapping relationship between face part feature point sets in the face image to be recognized and feature point sets of various parts on the standard face.

The mapping relationship may be expressed by using a measurement relationship, for example, a distance and/or an angle. For example, in the facial geometric feature points detected in the face image to be recognized, a measurement relationship between one feature point in a nose part feature point set and one feature point in a nose part feature point set of the standard face is a.

For example, it is assumed that a quantity of facial geometric feature points in the standard face is 68, and a quantity of facial geometric feature points detected in the face image to be recognized is 68. In a planar coordinate system, one feature point may be identified by using two-dimensional data. A data volume of a location relationship between one feature point in the face image to be recognized and the 68 points in a standard face image is 1*68*2, and a data volume of a location relationship between the 68 feature points in the face image to be recognized and the 68 points in the standard face image is a data block of 68*68*2.

The face topology structure feature may be obtained by inputting data that represents the mapping relationship into the pre-trained face topology structure feature extraction network.

604: Extract a face part image.

The face recognition apparatus may determine each face part in the face image.

There are a plurality of methods for determining each face part in the face image. A geometric feature point may be extracted first, and then the face part is segmented from the face image. Alternatively, a pre-trained face part discrimination model may be configured to extract the face part. A method for determining each face part in the face image is not specifically limited herein.

Figure 10:
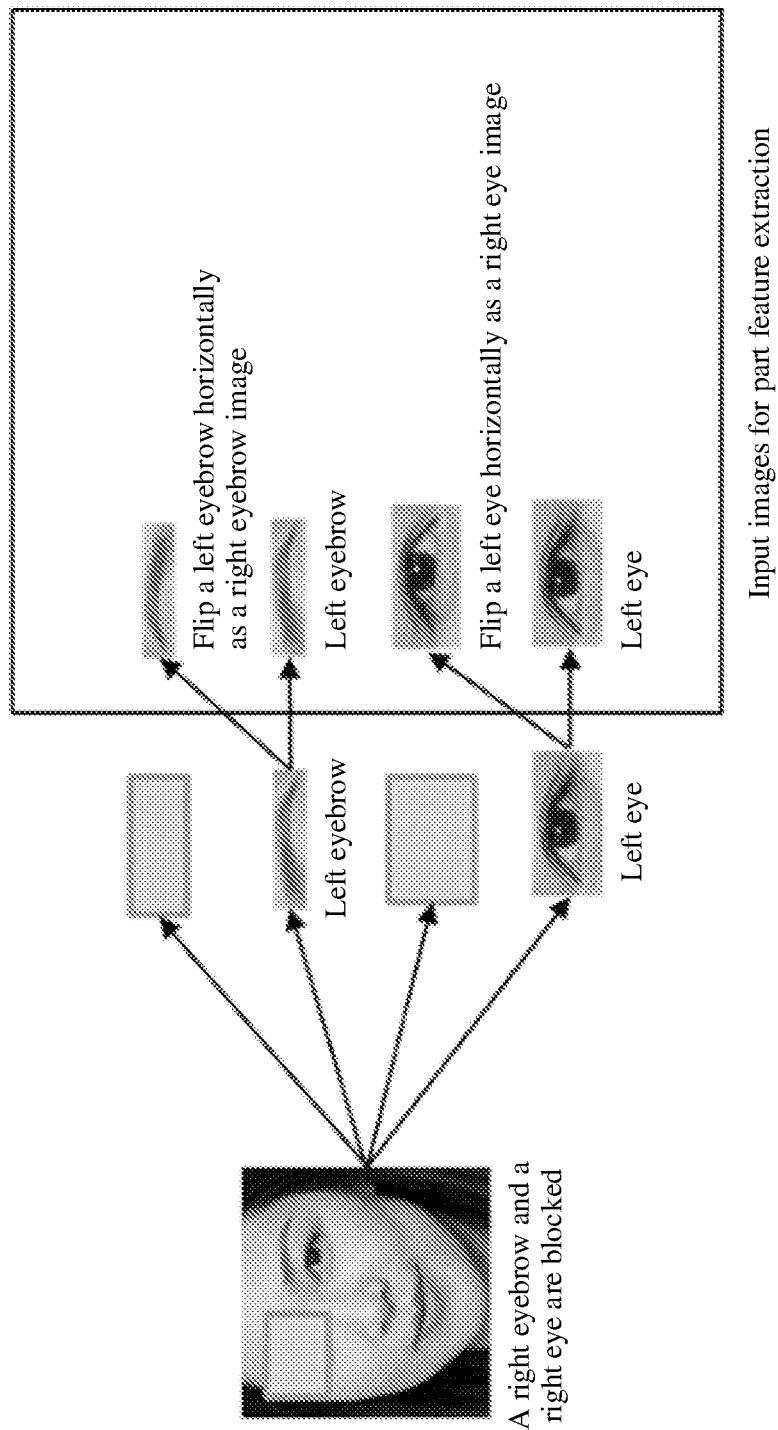
FIG. 10 is a schematic diagram of a face part image and blocking flipping processing according to an embodiment of this application.

Optionally, the face parts extracted from the image include a mouth, a nose, a left eye, a left eyebrow, a right eye, and a right eyebrow. The face parts to be discriminated may be preset. This is not limited herein. FIG. 10 is a schematic diagram of a face part image and blocking flipping processing according to an embodiment of this application.

Optionally, whether each face part is blocked is determined based on a preset part discrimination model for each face part. If a blocked part is one of paired parts, and the other of the paired parts is not blocked, for example, as shown in FIG. 10, one eyebrow or eye is blocked, the other part that is not blocked of the paired parts is horizontally flipped, and is used as a restored image of the current blocked part.

It should be noted that an execution sequence of step 604 and step 603 is not limited, and step 603 may be performed before step 604, or step 604 may be performed before step 603.

605: Obtain a face image feature.

A complete face image preprocessed in step 602 is input into a global face feature extraction network obtained by training a first network for feature extraction, and a global face feature is output.

The face part image obtained in step 604 is input into a pre-trained part feature extraction network for feature extraction, and a target part feature is output. It should be noted that a corresponding feature extraction network may be preset for each face part. For a plurality of parts of a face, different part feature extraction networks may be respectively preset for feature extraction, and then the target part feature is obtained by comprehensively using a single part feature extracted for each part.

Optionally, the target part feature is a weighted average value of a plurality of part features, and weight values of the plurality of part features are preset values. Optionally, the face recognition apparatus detects whether a face part in a plurality of face part images are blocked. For a blocked part, a weight value may be reduced based on an initial preset weight value of the part. In this way, impact of part blocking on face recognition can be reduced.

Figure 11:
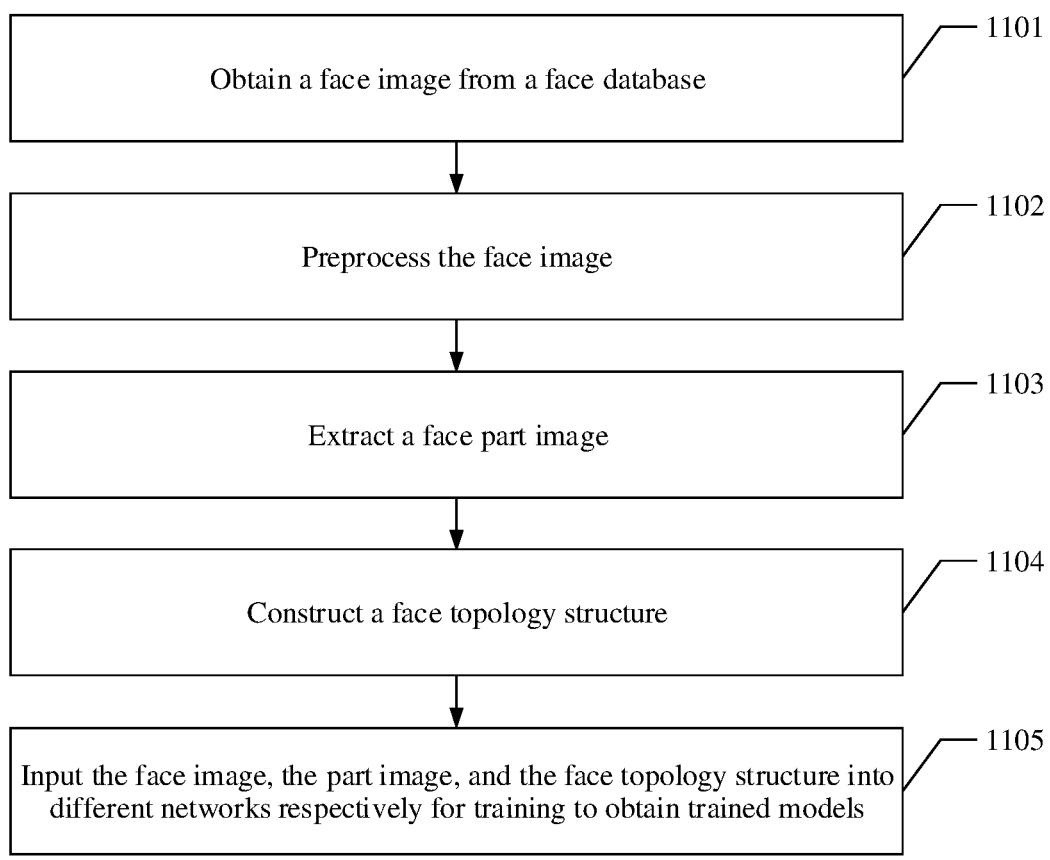
FIG. 11 is a schematic diagram of an embodiment of a feature extraction network training method according to an embodiment of this application.

For training processes of the global face feature extraction network, the face topology structure feature extraction network, and the part feature extraction network, refer to an embodiment corresponding to FIG. 11. Details are not described herein again.

606: Perform feature comparison to obtain a face recognition result.

A feature matching module matches a feature of a current face with a face feature in a face database, and obtains the face recognition result based on similarity measurement between the features.

In the face recognition method provided in this embodiment of this application, face recognition is divided into integral face recognition, part recognition, and feature recognition based on structured information. Task dissection can reduce a network volume to some extent, reduce a network depth, and increase a width, so that a feature extraction process is more efficient and effective.

A feature is extracted for a part, to reduce impact of a low-response area, enhance a receptive field of a high-response area, learn more texture information, and enhance judgment and robustness of the feature. A policy with a weight distribution is used during part identification, to reduce impact of a low-response part on a final discrimination result, and improve impact of the high-response area, and is beneficial to face recognition.

When a part is blocked and information of the part is invalid, a face part to be matched is flipped, a feature is extracted, and a blocking discriminator is added, to reduce impact of the blocked part on face recognition.

A feature extraction unit dedicated to learning the face topology structure is proposed to learn a difference between a face and the standard face and a link between topology nodes. By linking information between layers, more structured information is obtained, and impact of blocking on face recognition can be reduced without affecting normal face recognition.

The following describes a feature extraction network training method in the face recognition method provided in this application. Refer to FIG. 11. The method includes the following steps.

1101: Obtain a face image from a face database.

A face recognition apparatus obtains the face image from the face database. The face database may be downloaded from the Internet. Alternatively, the face recognition apparatus can establish a part of the database. This is not specifically limited herein. A common face database includes an LFW dataset, a Yale series, and the like.

Optionally, the face database includes a blocked face image, or blocking processing is performed on the face image in the face database to generate a blocked face image. This is not specifically limited herein.

1102: Preprocess the face image.

1103: Extract a face part image.

Step 1102 and step 1103 are similar to the methods in step 602 and step 604 in the embodiment corresponding to FIG. 6. Details are not described herein again.

1104: Construct a face topology structure.

Refer to step 603 in the embodiment corresponding to FIG. 6, the mapping relationship between the plurality of face part feature point sets and the face part feature point sets of the standard face is constructed, and the data that represents the mapping relationship is obtained to represent the face topology structure.

1105: Input the face image, the part image, and the face topology structure into different networks respectively for training.

Figure 12:
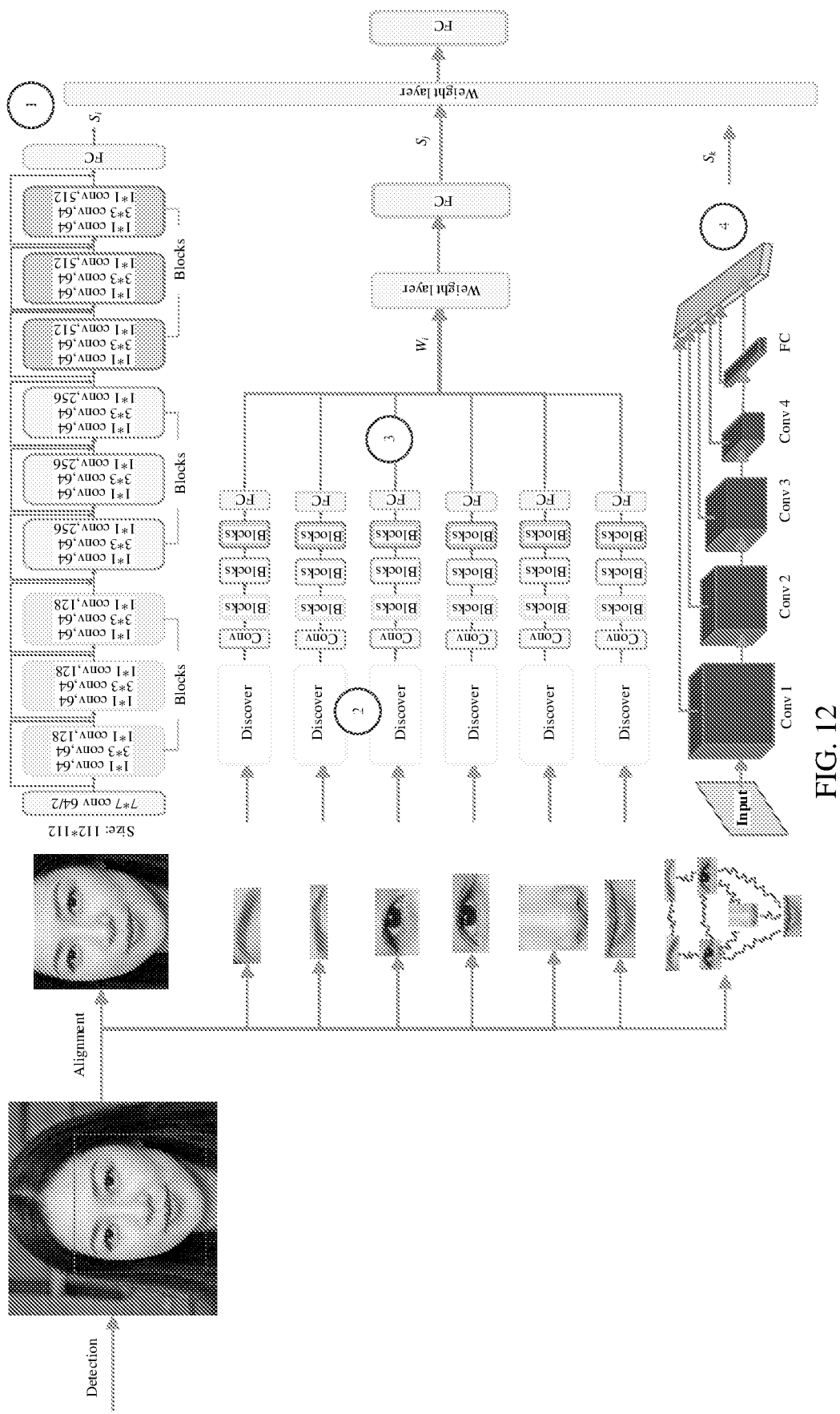
FIG. 12 is a schematic diagram of an architecture of a feature extraction network according to an embodiment of this application.

The face image, the part image, and face topology data are respectively input into a network 1, a network 2, and a network 3 for training. FIG. 12 is a schematic diagram of an architecture of a feature extraction network according to an embodiment of this application.

1. A training process of the global face feature extraction network obtained by training the network 1 corresponds to a part 1 identified in FIG. 12.

The first network may be any existing global face feature extraction network. This is not specifically limited herein.

For example, a face image with image data of H*W*3 is input, where H is a height of the image, W is a width of the image, and 3 represents RGB (red, green, blue) three channels. Optionally, images of a plurality of scales are used as an input for training, so that the images are robust in the plurality of scales.

The input image passes through nine convolutional layers, each block in FIG. 12 includes three convolutional layers, and a vector [T*1] is output.

A fully connected layer is followed by a softmax layer (not shown in the figure). An input of this layer is to input the vector [T*1] into the softmax layer, and an output is also the vector [T*1]. Each output vector is normalized to [0, 1]. The vector output by softmax is a probability that a sample belongs to each class.

A loss function L1 of the first network is as follows:

$$L_1 = L_s + \partial L_c = -\frac{1}{m}\sum_{i=1}^{m}\log\frac{e^{w_i x_i + b_i}}{\sum_{j=1}^{n} e^{w_j x_j + b_j}} + \partial \sum_{i=1}^{m}\frac{x_i \cdot x_j}{\|x_i\| \cdot \|x_j\|}$$

Ls is an interclass difference softmax loss, Lc is an intraclass individual difference center loss, m is a batch size (batch_size), Xi is an $i^{th}$ value of the vector [T*1], Xj is a $j^{th}$ value, wi is a weight value of convolution, and is learned by reverse propagation, and bi is a corresponding offset.

The input image passes through the network 1 to obtain a feature matrix (1*W dimension). A score corresponding to each image block is a real number in the range of [0, 1].

2. A training process of the part feature extraction network obtained by training the network 2 corresponds to parts 2 and 3 identified in FIG. 12.

Different face parts are of different importance to face recognition. Generally, a weight of eyes is highest, weights of a nose and a mouth is second highest, and a weight of eyebrows is lowest.

In addition, whether a part is blocked also affects a face recognition effect. If a part is blocked, a weight of the part should be reduced.

In this step, an input of each part network is a part image of H*W*3, and a part discriminator processes an image of each part to obtain a result about whether each face part is blocked.

The preceding figure shows an example of a part network. A small part network can be used as the part network to extract a feature for a part, to reduce the impact of a low-response area, enhance the receptive field of a high-response area, learn more high-resolution texture information, and enhance judgment and robustness of the feature.

Based on response features of different face parts, an initial weight value is set for each part, and can be defined by a product developer. For example, the weight of the eyes is 0.4, the weights of the nose and the mouth are 0.25, and the weight of the eyebrows is 0.1.

An N*1-dimension feature vector and a final part weight value wi of each part are obtained through the part network based on image data of a current part and a result about whether the part is blocked that are processed by the part discriminator.

If a part is blocked, a weight is adjusted for decrease based on an initial weight value. For example, if an eye is blocked, a weight value of the eye part is adjusted to 0 after passing through a part network.

A loss function is as follows:

$$L_2 = \sum_{i=1}^{k} wi * Li$$

wi is a weight value of convolution, k represents a quantity of extracted face parts, and Li is a loss computing function of each part. A computing formula is as follows:

$$L_i = -\log\left(\frac{e^{s(\cos(\theta_i) - m)}}{e^{s(\cos(\theta_i) - m)} + \sum_{k=1, i \neq i}^{n} e^{s\cos(\theta_i)}}\right)$$

$\theta_{j,i}$ is an angle between vectors $W_j$, $x_i$, $\theta_{i,j} \in (0,\pi)$, and a cosine represents an angle cosine value of a feature vector and a weight vector. A parameter m is used to make an interclass distance large enough and an intraclass distance small enough.

3. The face topology structure feature extraction network obtained by training the network 3 corresponds to a part 4 identified in FIG. 12.

When a face topology structure is constructed in a standard face manner, data representing a mapping relationship is obtained, and the data is input into the network 3 for training to obtain the face topology structure feature extraction network that can be used to obtain a face topology structure feature.

The face topology structure feature extraction network can be obtained by training the network 3. A measurement relationship of 68 face feature points in two dimensions is used as an example. A network input is a data block of 68*68*2. A differentiated feature between a face and the standard face is extracted and constructed by using a convolutional layer and fully connected layer of a network, and an M*1-dimension feature vector is output.

A loss function L3 of the network 3 is as follows:

$$L_3 = -\frac{1}{m}\sum_{i=1}^{m}\log\frac{e^{w_i x_i + b_i}}{\sum_{j=1}^{n} e^{w_j x_j + b_j}}$$

m is a batch size (batch_size), n is XX, Xi is an $i^{th}$ value of a vector [T*1], Xj is a $j^{th}$ value, wi is a weight value of convolution, wj represents XX, and is learned by reverse propagation, bi is an offset corresponding to the $i^{th}$ value, and bj is an offset corresponding to the $j^{th}$ value.

4. An output Si of the network 1, an output Sj of the network 2, and an output Sk of the network 3 are integrated into one output.

$$L_{total} = S_i L_1 + S_j L_2 + S_k L_3$$

Optionally, in a training process, the part feature (network 2) may not be trained. In a recognition process, the face recognition is completed by using the global face feature and the face topology structure feature.

Optionally, in a training process, the global face feature (network 1) may not be trained. In a recognition process, the face recognition is completed by using the face part feature and the face topology structure feature.

Figure 13:
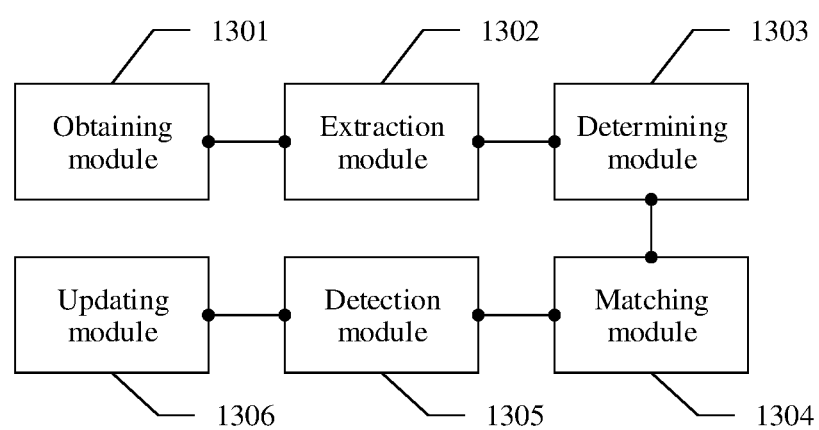
FIG. 13 is a schematic diagram of an embodiment of a face recognition apparatus according to an embodiment of this application.

The following describes a face recognition apparatus for implementing face recognition. FIG. 13 is a schematic diagram of an embodiment of a face recognition apparatus according to an embodiment of this application.

The face recognition apparatus includes:

an obtaining module 1301, configured to obtain a face image to be recognized;

an extraction module 1302, configured to extract a face image feature based on the face image by using a pre-trained feature extraction network;

a determining module 1303, configured to extract a plurality of facial geometric feature points from the face image to determine a plurality of feature point sets, where each feature point set of the plurality of feature point sets corresponds to one face part, and the feature point set includes at least one facial geometric feature point; and the obtaining module 1301 is further configured to obtain a face topology structure feature based on the plurality of feature point sets, and the face topology structure feature is used to determine a relative location relationship between the plurality of feature point sets; and a matching module 1304, configured to perform matching in a preset face database based on the face topology structure feature and the face image feature, to obtain a face recognition result.

Optionally, the face topology structure feature includes:
a feature vector set, where a feature vector in the feature vector set is used to indicate a relative location relationship between any two of the plurality of feature point sets; or
a feature matrix, where an element in the feature matrix is used to indicate a relative location relationship between any two of the plurality of feature point sets.

Optionally, the determining module 1303 is further configured to:
construct a mapping relationship between the plurality of feature point sets and a plurality of feature point sets of a standard face, where the mapping relationship is used to determine the relative location relationship between the plurality of feature point sets.

The obtaining module 1301 is specifically configured to input the mapping relationship into a pre-trained face topology structure feature extraction network to obtain the face topology structure feature.

Optionally, the mapping relationship includes a distance and/or an angle between the plurality of feature point sets and the plurality of feature point sets of the standard face.

Optionally, the face topology structure feature extraction network is obtained after a first network is trained. The extraction module 1302 is further configured to extract a plurality of facial geometric feature points from a face image training sample to determine a plurality of sample feature point sets. Each of the plurality of sample feature point sets corresponds to one face part of the training sample, and the sample feature point set includes at least one facial geometric feature point.

The obtaining module 1301 is further configured to obtain a mapping relationship between the sample feature point sets and the feature point sets of the standard face, and input the mapping relationship into the first network for training to obtain a first loss value.

The obtaining module 1301 is further configured to update a weight parameter in the first network based on the first loss value, to obtain the face topology structure feature extraction network.

Optionally, the extraction module 1302 is specifically configured to: input the face image into a pre-trained global face feature extraction network to extract a global face feature.

Optionally, the extraction module 1302 is specifically configured to: extract a first face part image from the face image; and input the first face part image into a pre-trained first part feature extraction network to extract a first part feature, where the first part feature is used to perform matching in the face database to obtain the face recognition result.

Optionally, the first part feature extraction network is obtained after a second network is trained. The obtaining module 1301 is further configured to: input a face part image extracted from the face image training sample into the second network for training to obtain a second loss value.

The obtaining module 1301 is further configured to update a weight parameter in the second network based on the second loss value, to obtain the first part feature extraction network.

Optionally, the extraction module 1302 is further configured to: extract a plurality of face part images from the face image.

The extraction module 1302 is specifically configured to respectively input the plurality of face part images into a plurality of pre-trained part feature extraction networks to extract a plurality of part features.

The determining module 1303 is further configured to determine a target part feature of the face image based on the plurality of part features.

Optionally, the target part feature is determined based on a weighted average value of the plurality of part features, and weight values of the plurality of part features are preset values.

Optionally, the face recognition apparatus further includes:
a detection module 1305, configured to detect whether face parts in the plurality of face part images are blocked.

The determining module 1303 is further configured to determine, if a first face part in a first face part image is blocked, a second face part in a second face part image is not blocked, and the second face part is a symmetric part of the first face part, a horizontally flipped image of the second face part image as a restored image of the first face part. The restored image is used to be input into the part feature extraction network to extract the part feature.

Optionally, the face recognition apparatus further includes:

an updating module 1306, configured to update a weight value of a part feature of the first face part based on that the first face part is blocked, where an updated first weight value is less than a preset first weight value of the first face part.

Optionally, the obtaining module 1301 is further configured to:

preprocess the face image to obtain a preprocessed face image, where preprocessing includes face alignment, and the preprocessed face image is used in extracting of the face image feature and extracting of the plurality of facial geometric feature points.

Figure 14:
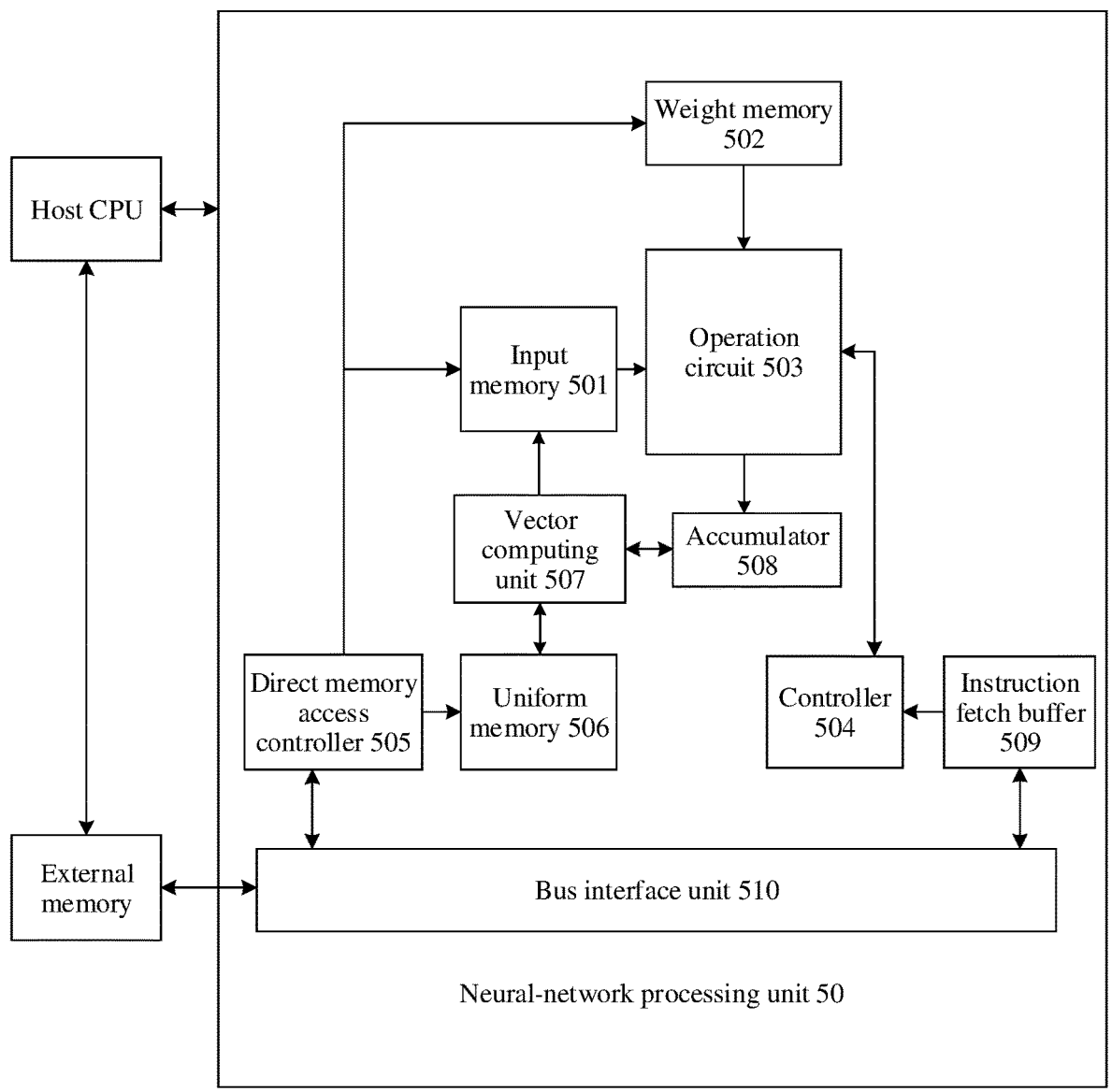
FIG. 14 is a diagram of a hardware structure of a chip according to an embodiment of this application.

FIG. 14 is a diagram of a hardware structure of a chip according to an embodiment of this application.

Figure 4:
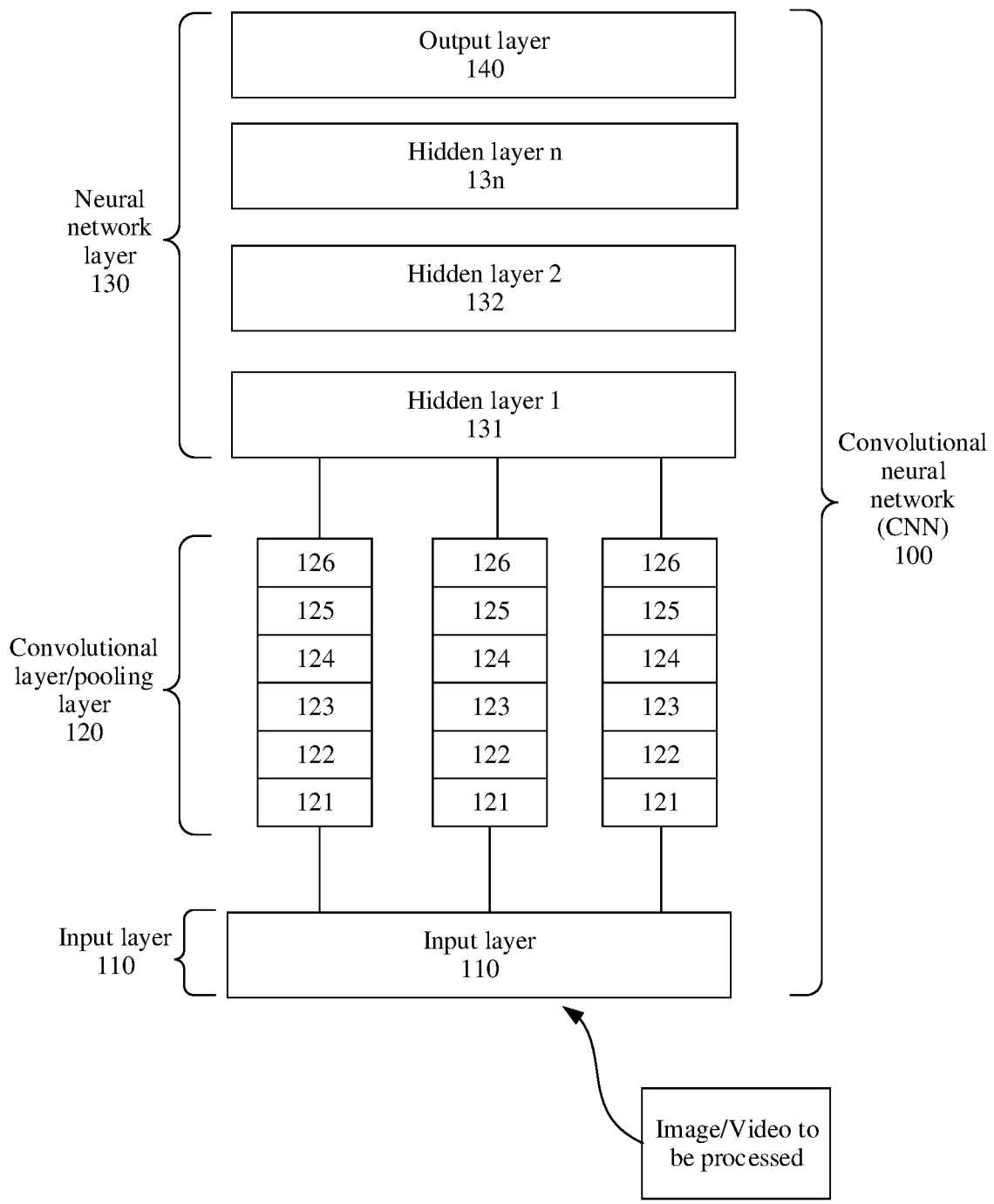
FIG. 4 is a schematic diagram of a structure of another convolutional neural network according to an embodiment of this application.

The convolutional neural network-based algorithms shown in FIG. 3 and FIG. 4 may be implemented in an NPU chip shown in FIG. 14.

A neural-network processing unit NPU 50 NPU, as a coprocessor, is mounted to a host CPU (Host CPU), and the host CPU allocates a task. A core part of the NPU is an operation circuit 50. The operation circuit 503 is controlled by a controller 504 to extract matrix data in a memory and perform a multiplication operation.

In some implementations, the operation circuit 503 internally includes a plurality of process elements (process engine, PEs). In some implementations, the operation circuit 503 is a two-dimensional systolic array. Alternatively, the operation circuit 503 may be a one-dimensional systolic array or another electronic circuit that can perform mathematical operations such as multiplication and addition. In some implementations, the operation circuit 503 is a general-purpose matrix processor.

For example, it is assumed that there are an input matrix A, a weight matrix B, and an output matrix C. The operation circuit extracts corresponding data of the matrix B from a weight memory 502, and buffers the corresponding data into each PE in the operation circuit. The operation circuit extracts data of the matrix A from an input memory 501, to perform a matrix operation on the matrix B, and a partial result or a final result of an obtained matrix is stored in an accumulator (accumulator) 508.

A uniform memory 506 is configured to store input data and output data. Weight data is transferred to the weight memory 502 by using a direct memory access controller (direct memory access controller, DMAC) 505. The input data is also transferred to the uniform memory 506 by using the DMAC.

A BIU is a bus interface unit, in other words, a bus interface unit 510, and is configured to perform interaction between an AXI bus, and the DMAC and an instruction fetch buffer 509 (Instruction Fetch Buffer).

The bus interface unit (bus interface unit, BIU for short) 510 is used by the instruction fetch buffer 509 to obtain instructions from an external memory, and is further used by the direct memory access controller 505 to obtain original data of the input matrix A or the weight matrix B from the external memory.

The DMAC is mainly configured to transfer input data in the external memory DDR to the uniform memory 506, or transfer the weight data to the weight memory 502, or transfer the input data to an input memory 501.

A vector computing unit 507 may include a plurality of operation processing units. If required, further processing is performed on an output of the operation circuit, for example, vector multiplication, vector addition, an exponential operation, a logarithmic operation, or size comparison. The vector computing unit 507 is mainly configured to perform network computing at a non-convolution/FC layer in a neural network, for example, pooling (pooling), batch normalization (batch normalization), or local response normalization (local response normalization).

In some implementations, the vector computing unit 507 can store a processed output vector in the uniform memory 506. For example, the vector computing unit 507 may apply a non-linear function to an output, for example, a vector of an accumulated value, of the operation circuit 503 to generate an activation value. In some implementations, the vector computing unit 507 generates a normalized value or a combined value or both. In some implementations, the processed output vector can be used as an activation input for the operation circuit 503, for example, used in a subsequent layer in the neural network.

The instruction fetch buffer (instruction fetch buffer) 509 connected to the controller 504 is configured to store instructions used by the controller 504.

The uniform memory 506, the input memory 501, the weight memory 502, and the instruction fetch buffer 509 are all on-chip memories. The external memory is private for the NPU hardware architecture.

An operation at each layer in the convolutional neural network shown in FIG. 3 and the convolutional neural network FIG. 4 may be performed by a matrix computing unit 212 or the vector computing unit 507.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

Figure 15:
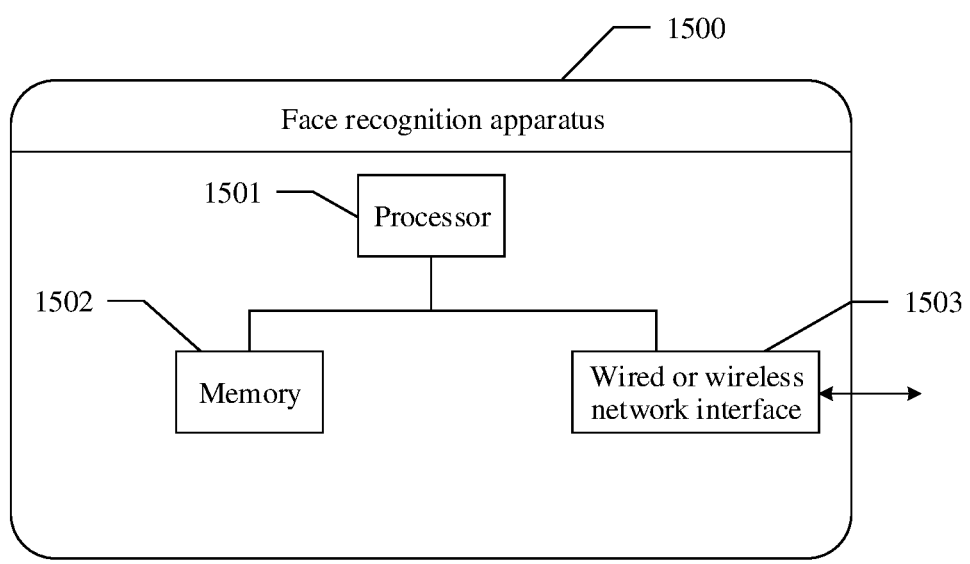
FIG. 15 is a schematic diagram of another embodiment of a face recognition apparatus according to an embodiment of this application.

FIG. 15 is a schematic diagram of another embodiment of a face recognition apparatus according to an embodiment of this application. The face recognition apparatus provided in this embodiment may include a terminal or a server. A specific device form of the face recognition apparatus is not limited in this embodiment of this application.

The face recognition apparatus 1500 may differ greatly due to different configurations or performance, and may include one or more processors 1501 and a memory 1502. The memory 1502 stores a program or data.

The memory 1502 may be a volatile memory or a non-volatile memory. Optionally, the processor 1501 is one or more central processing units (Central Processing Units, CPUs). The CPU may be a single-core CPU, or may be a multi-core CPU. The processor 1501 may communicate with the memory 1502, and execute, on the face recognition apparatus 1500, a series of instructions in the memory 1502.

The face recognition apparatus 1500 further includes one or more wired or wireless network interfaces 1503, for example, an Ethernet interface.

Optionally, although not shown in FIG. 15, the face recognition apparatus 1500 may further include one or more power supplies and one or more input/output interfaces. The input/output interface may be configured to connect to a display, a mouse, a keyboard, a touchscreen device, an image collection module, or another sensing device. The input/output interface is an optional component, and may or may not exist. This is not limited herein.

For a procedure executed by the processor 1501 in the face recognition apparatus 1500 in this embodiment, refer to the method procedures described in the foregoing method embodiments. Details are not described herein again.

In the several embodiments provided in this application, it should be understood that the disclosed system, apparatus, and method may be implemented in other manners. For example, the foregoing described apparatus embodiments are merely examples. For example, division of the units is merely a logical function division and may be another division during actual implementation. For example, a plurality of units or components may be combined or integrated into another system, or some features may be ignored or may not be performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate components may or may not be physically separate, and components displayed as units may or may not be physical units. To be specific, the components may be located at one location, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software function unit.

When being implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in embodiments of this application. The foregoing storage medium includes any medium that can store program code, for example, a USB flash drive, a removable hard disk, a read-only memory (read-only memory, ROM), a random access memory (random access memory, RAM), a floppy disk, or a compact disc.

The foregoing embodiments are merely intended to describe the technical solutions of this application, but are not intended to limit this application. Although this application is described in detail with reference to the foregoing embodiments, a person of ordinary skill in the art should understand that the technical solutions described in the foregoing embodiments may still be modified or some technical features thereof may be equivalently replaced, without departing from the spirit and scope of the technical solutions of embodiments of this application.

What is claimed is:

1. A method, applied to an apparatus, the method comprising:
   obtaining a face image to be recognized;
   extracting a face image feature based on the face image using a pre-trained feature extraction network;
   extracting a plurality of facial geometric feature points from the face image to determine a plurality of feature point sets, wherein each feature point set of the plurality of feature point sets corresponds to one face part, and each feature point set comprises at least one facial geometric feature point;
   obtaining a face topology structure feature based on the plurality of feature point sets, wherein the face topology structure feature is used to determine a relative location relationship between the feature point sets of the plurality of feature point sets; and
   performing matching in a preset face database based on the face topology structure feature and the face image feature, to obtain a face recognition result,
   wherein obtaining the face topology structure feature based on the plurality of feature point sets comprises:
      constructing a mapping relationship between the plurality of feature point sets and a plurality of feature point sets of a standard face, wherein the mapping relationship is used to determine the relative location relationship between the feature point sets of the plurality of feature point sets; and
      inputting the mapping relationship into a pre-trained face topology structure feature extraction network to obtain the face topology structure feature.

2. The method according to claim 1, wherein the face topology structure feature comprises:
   a feature vector set, wherein each feature vector in the feature vector set indicates a relative location relationship between a respective two feature point sets of the plurality of feature point sets.

3. The method according to claim 1, wherein the mapping relationship comprises a distance or an angle between the plurality of feature point sets and the plurality of feature point sets of the standard face.

4. The method according to claim 1, wherein the pre-trained face topology structure feature extraction network is obtained after a first network is trained, and the method further comprises:
   extracting a plurality of facial geometric feature points from a face image training sample to determine a plurality of sample feature point sets, wherein each sample feature point set of the plurality of sample feature point sets corresponds to one face part of the face image training sample, and each sample feature point set of the plurality of sample feature point sets comprises at least one sample facial geometric feature point;
   obtaining a mapping relationship between the sample feature point sets and the plurality of feature point sets of the standard face, and inputting the mapping relationship into the first network for training to obtain a first loss value; and
   updating a weight parameter in the first network based on the first loss value, to obtain the pre-trained face topology structure feature extraction network.

5. The method according to claim 1, wherein extracting the face image feature based on the face image using the pre-trained feature extraction network comprises:
   inputting the face image into a pre-trained global face feature extraction network to extract a global face feature.

6. The method according to claim 1, further comprising:
   extracting a first face part image from the face image; and
   wherein extracting the face image feature based on the face image using the pre-trained feature extraction network comprises:

inputting the first face part image into a pre-trained first part feature extraction network to extract a first part feature, wherein the first part feature is used to perform matching in the preset face database to obtain the face recognition result.

7. The method according to claim 6, wherein the pre-trained first part feature extraction network is obtained after a second network is trained, and the method further comprises:
inputting a face part image extracted from a face image training sample into the second network for training to obtain a second loss value; and
updating a weight parameter in the second network based on the second loss value, to obtain the pre-trained first part feature extraction network.

8. The method according to claim 1, further comprising:
extracting a plurality of face part images from the face image; and
wherein extracting the face image feature based on the face image by using the pre-trained feature extraction network comprises:
respectively inputting face part images of the plurality of face part images into a plurality of pre-trained part feature extraction networks to extract a plurality of part features; and
determining a target part feature of the face image based on the plurality of part features.

9. The method according to claim 8, wherein the target part feature is determined based on a weighted average value of the part features of the plurality of part features, and weight values of the plurality of part features are preset values.

10. The method according to claim 8, further comprising:
detecting whether face parts in the plurality of face part images are blocked; and
determining, when a first face part in a first face part image is blocked, a second face part in a second face part image is not blocked, and the second face part is a symmetric part of the first face part, a horizontally flipped image of the second face part image as a restored image of the first face part, wherein the restored image is used to be input into one of the plurality of pre-trained part feature extraction networks to extract the target part feature.

11. The method according to claim 10, further comprising:
updating a weight value of a part feature of the first face part based on the first face part being blocked, to obtain an updated first weight value, wherein the updated first weight value is less than a preset first weight value of the first face part.

12. The method according to claim 1, further comprising:
preprocessing the face image to obtain a preprocessed face image, wherein the preprocessing comprises face alignment, and the preprocessed face image is used in extracting the face image feature and extracting the plurality of facial geometric feature points.

13. An apparatus, comprising:
at least one processor and a memory, wherein the memory is coupled to the at least one processor, the memory is configured to store a computer program, the computer program comprises program instructions, and when the at least one processor executes the program instructions, the apparatus is caused to:
obtain a face image to be recognized;
extract a face image feature based on the face image using a pre-trained feature extraction network;
extract a plurality of facial geometric feature points from the face image to determine a plurality of feature point sets, wherein each feature point set of the plurality of feature point sets corresponds to one face part, and each feature point set comprises at least one facial geometric feature point;
obtain a face topology structure feature based on the plurality of feature point sets, wherein the face topology structure feature is used to determine a relative location relationship between the feature point sets of the plurality of feature point sets; and
perform matching in a preset face database based on the face topology structure feature and the face image feature, to obtain a face recognition result,
wherein the face topology structure feature based on the plurality of feature point sets is obtained by:
constructing a mapping relationship between the plurality of feature point sets and a plurality of feature point sets of a standard face, wherein the mapping relationship is used to determine the relative location relationship between the feature point sets of the plurality of feature point sets; and
inputting the mapping relationship into a pre-trained face topology structure feature extraction network to obtain the face topology structure feature.

14. The apparatus according to claim 13, wherein the face topology structure feature comprises:
a feature vector set, wherein each feature vector in the feature vector set indicates a relative location relationship between a respective two feature point sets of the plurality of feature point sets.

15. The apparatus according to claim 13, wherein the mapping relationship comprises a distance or an angle between the plurality of feature point sets and the plurality of feature point sets of the standard face.

16. The apparatus according to claim 13, wherein the pre-trained face topology structure feature extraction network is obtained after a first network is trained, and when the at least one processor executes the program instructions, the apparatus is further caused to:
extract a plurality of facial geometric feature points from a face image training sample to determine a plurality of sample feature point sets, wherein each sample feature point of the plurality of sample feature point sets corresponds to one face part of the face image training sample, and each sample feature point set of the plurality of sample feature point sets comprises at least one sample facial geometric feature point;
obtain a mapping relationship between the plurality of sample feature point sets and the plurality of feature point sets of the standard face, and input the mapping relationship into the first network for training to obtain a first loss value; and
update a weight parameter in the first network based on the first loss value, to obtain the pre-trained face topology structure feature extraction network.

17. The apparatus according to claim 13, wherein extracting the face image feature based on the face image using the pre-trained feature extraction network comprises:
inputting the face image into a pre-trained global face feature extraction network to extract a global face feature.

18. The apparatus according to claim 13, wherein when the at least one processor executes the program instructions, the apparatus is further caused to:
- extract a first face part image from the face image; and
- wherein extracting the face image feature based on the face image using the pre-trained feature extraction network comprises:
  - inputting the first face part image into a pre-trained first part feature extraction network to extract a first part feature, wherein the first part feature is used to perform matching in the face preset database to obtain the face recognition result.

19. The method according to claim 1, wherein the face topology structure feature comprises:
- a feature matrix, wherein each element in the feature matrix indicates a relative location relationship between a respective two feature point sets of the plurality of feature point sets.

20. The apparatus according to claim 13, wherein the face topology structure feature comprises:
- a feature matrix, wherein each element in the feature matrix indicates a relative location relationship between a respective two feature point sets of the plurality of feature point sets.

* * * * *